United States Patent
Konomi et al.

(10) Patent No.: US 11,050,583 B2
(45) Date of Patent: Jun. 29, 2021

(54) DEVICE CONTROL APPARATUS, DEVICE CONTROL SYSTEM, DEVICE CONTROL METHOD, AND RECORDING MEDIUM

(71) Applicant: International Laboratory Corporation, Hiroshima (JP)

(72) Inventors: Kosuke Konomi, Hiroshima (JP); Yasunori Yamasaki, Hiroshima (JP)

(73) Assignee: INTERNATIONAL LABORATORY CORPORATION, Hiroshima (JP)

( * ) Notice: Subject to any disclaimer, the term of this patent is extended or adjusted under 35 U.S.C. 154(b) by 7 days.

(21) Appl. No.: 16/175,771

(22) Filed: Oct. 30, 2018

(65) Prior Publication Data

US 2019/0319818 A1   Oct. 17, 2019

(30) Foreign Application Priority Data

Apr. 12, 2018   (JP) .............................. JP2018-077195

(51) Int. Cl.
*H04L 12/28* (2006.01)
*H04L 12/54* (2013.01)
*H04L 12/70* (2013.01)

(52) U.S. Cl.
CPC .......... *H04L 12/2838* (2013.01); *H04L 12/56* (2013.01); *H04L 2012/5614* (2013.01)

(58) Field of Classification Search
CPC ................ H04L 12/2838; H04L 12/56; H04L 2012/5614
See application file for complete search history.

(56) References Cited

U.S. PATENT DOCUMENTS

| 2005/0097108 | A1* | 5/2005 | Wang | G06F 16/284 |
| 2009/0028186 | A1* | 1/2009 | Schmidt | H04L 47/20 370/468 |
| 2013/0272303 | A1* | 10/2013 | Kamble | H04L 45/74 370/390 |
| 2014/0244834 | A1* | 8/2014 | Guedalia | H04L 67/16 709/224 |
| 2014/0324973 | A1* | 10/2014 | Goel | H04L 47/70 709/204 |
| 2014/0347982 | A1* | 11/2014 | Ozawa | H04L 43/00 370/229 |

(Continued)

FOREIGN PATENT DOCUMENTS

JP    2009-225481 A    10/2009

OTHER PUBLICATIONS

Tagliaferri, An Introduction to JSON, Dec. 8, 2016, Digital Ocean, pp. 1-14 (Year: 2016).*

*Primary Examiner* — John A Follansbee
*Assistant Examiner* — Raqiul A Choudhury
(74) *Attorney, Agent, or Firm* — Rabin & Berdo, P.C.

(57) ABSTRACT

A control apparatus is connected to another control apparatus that is connected to a network. The control apparatus acquires control information of another device controlled by the other control apparatus. The control apparatus, during control of the other device connected to the other control apparatus, executes a predetermined command having a format that is the same as that of an interface in the control apparatus and to which an identifier other than that of the control apparatus is appended, the control apparatus using a response from the other control apparatus as a result for the executed command.

17 Claims, 19 Drawing Sheets

(56) References Cited

U.S. PATENT DOCUMENTS

| | | | |
|---|---|---|---|
| 2015/0347114 A1* | 12/2015 | Yoon | G06F 8/61 |
| | | | 235/375 |
| 2016/0226732 A1* | 8/2016 | Kim | H04L 12/2807 |
| 2017/0017354 A1* | 1/2017 | Wei | G05B 19/042 |
| 2017/0257257 A1* | 9/2017 | Dawes | H04L 67/025 |
| 2018/0150041 A1* | 5/2018 | Ohishi | G05B 15/02 |

* cited by examiner

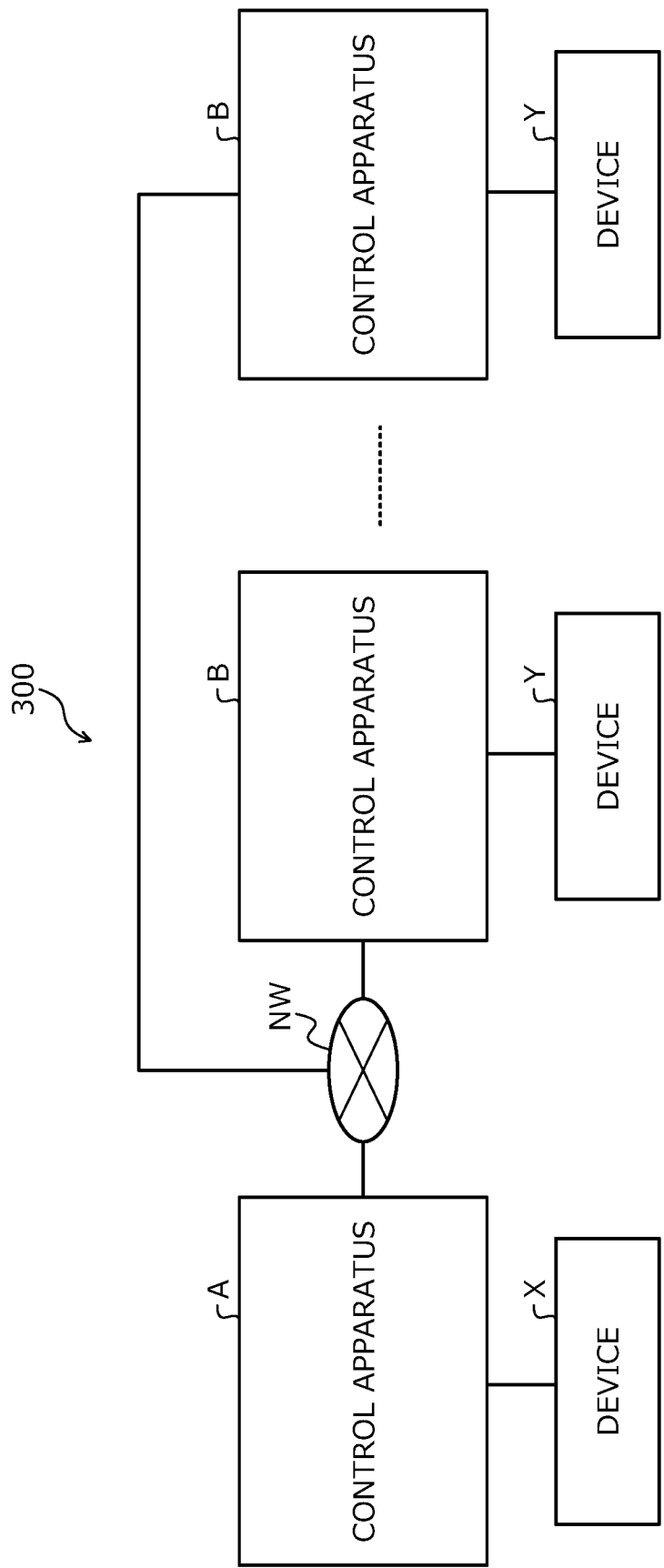

FIG.4A

```
/*ACCESS FROM APPARATUS A TO DEVICE X*/
void main ()  {
/*ACQUIRE DATA FROM DEVICE X*/
int idata=Read (X);
}
```
~P1

CONTROL PROGRAM OF DEVICE X CONNECTED
TO CONTROL APPARATUS A

FIG.4B

```
/*ACCESS FROM APPARATUS A TO DEVICE Y*/
void main ()  {
/*ACQUIRE DATA FROM DEVICE Y*/
int idata=Read (Y) ;
}
```
~P1

CONTROL PROGRAM OF DEVICE Y CONNECTED
TO CONTROL APPARATUS B

FIG.11

```
// ARGUMENT LIST OF print FUNCTION
struct ArgDef *print_arg_list_input[] = {
    // FORMAT: {<TYPE IDENTIFIER>, <SIZE OF TYPE>, <POINTER TO FUNCTION THAT CONVERTS TYPE INTO PACKET>,
    <POINTER TO FUNCTION THAT RECOVERS TYPE FROM PACKET>}
    {eInt16, 2, marshal_int16, unmarshal_int16}, // FIRST ARGUMENT
    {eInt32, 4, marshal_int32, unmarshal_int32}, // SECOND ARGUMENT
    :
    {0, 0, 0, 0}
};

//RETURN VALUE LIST OF print FUNCTION
struct ArgDef *print_arg_list_output[] = {
    {eUInt8, 1, marshal_uint8, unmarshal_uint8},
    {0, 0, 0, 0}
};

// LIST RETAINING ALL DISCLOSED INTERFACES
struct FunctionDef *functionList[] = {
    // FORMAT: {<DISCLOSED NAME>, <POINTER TO FUNCTION>, <ARRANGEMENT OF STRUCTURE REPRESENTING TYPE OF
    ARGUMENT>, <ARRANGEMENT OF STRUCTURE REPRESENTING TYPE OF RETURN VALUE>}
    {"print", print, print_arg_list_input, print_arg_list_output},
    :
    {"funcN", funcN, funcN_arg_list_input, funcN_arg_list_output},
    {0, 0, 0, 0}
};
```

FIG.12
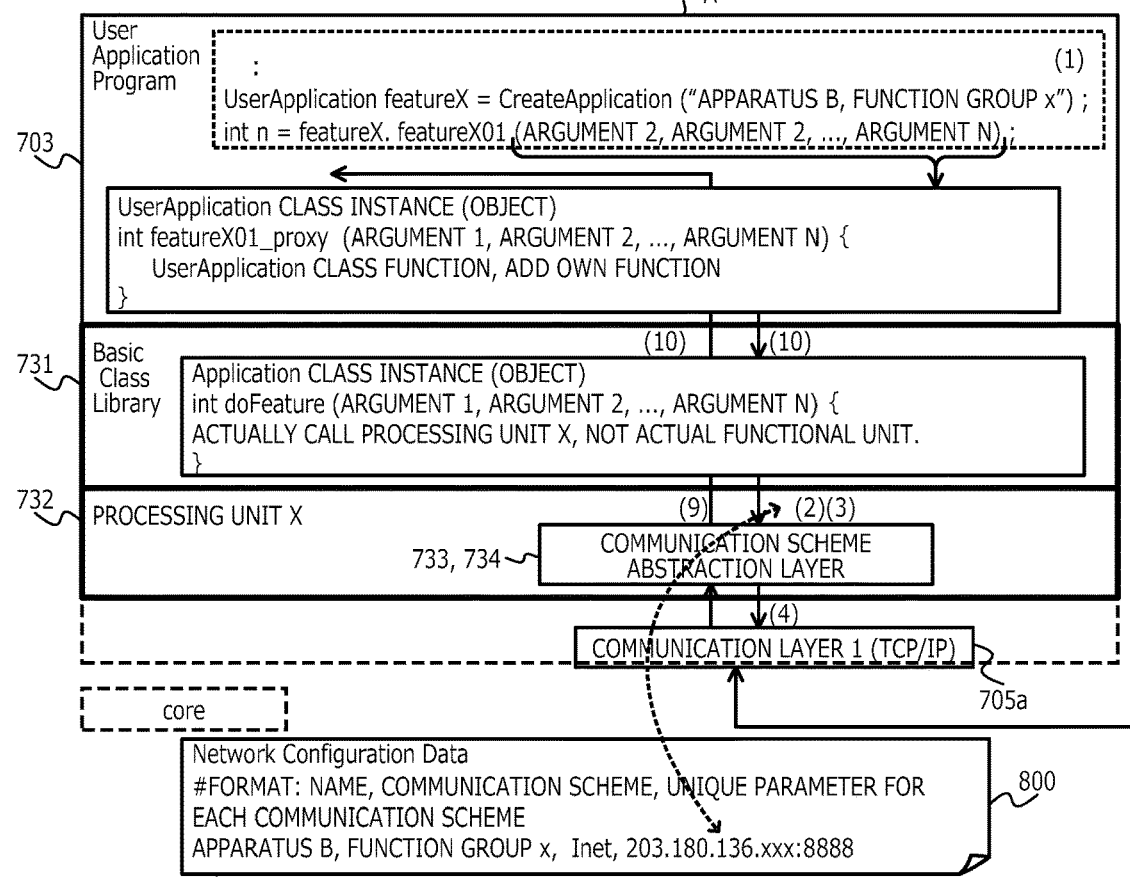
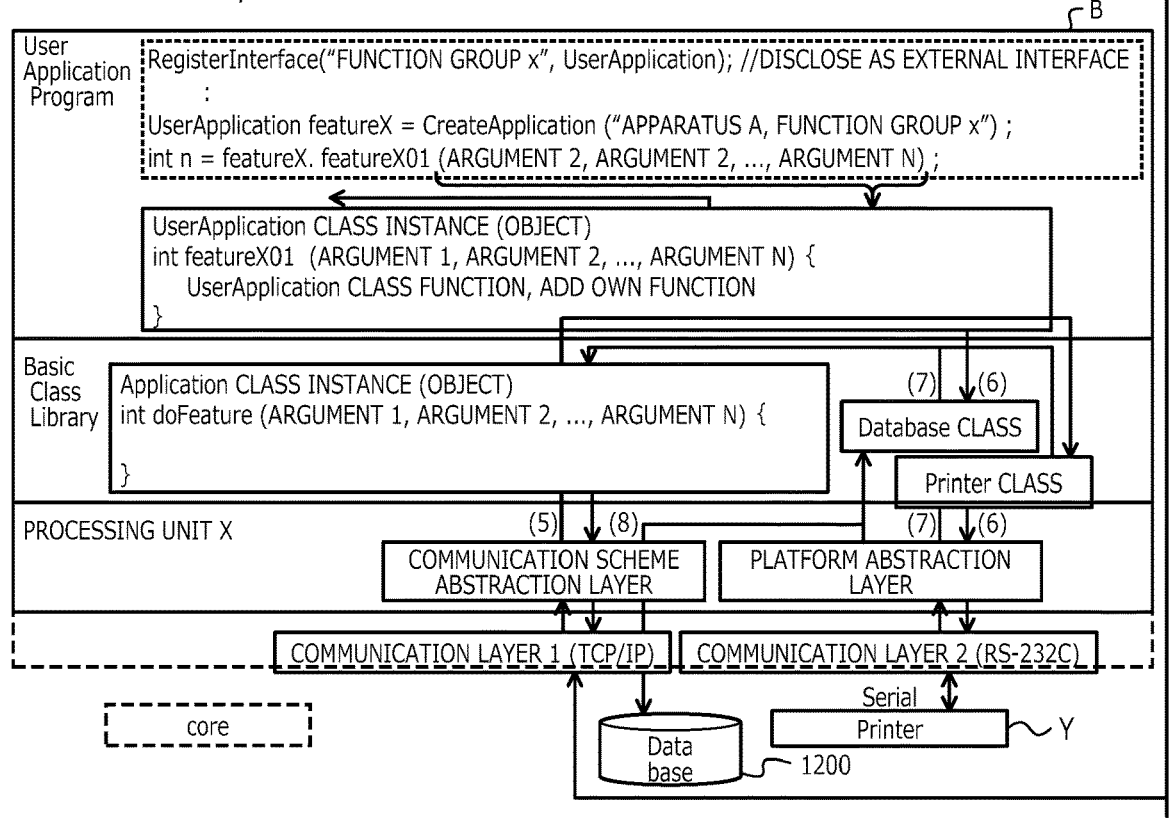

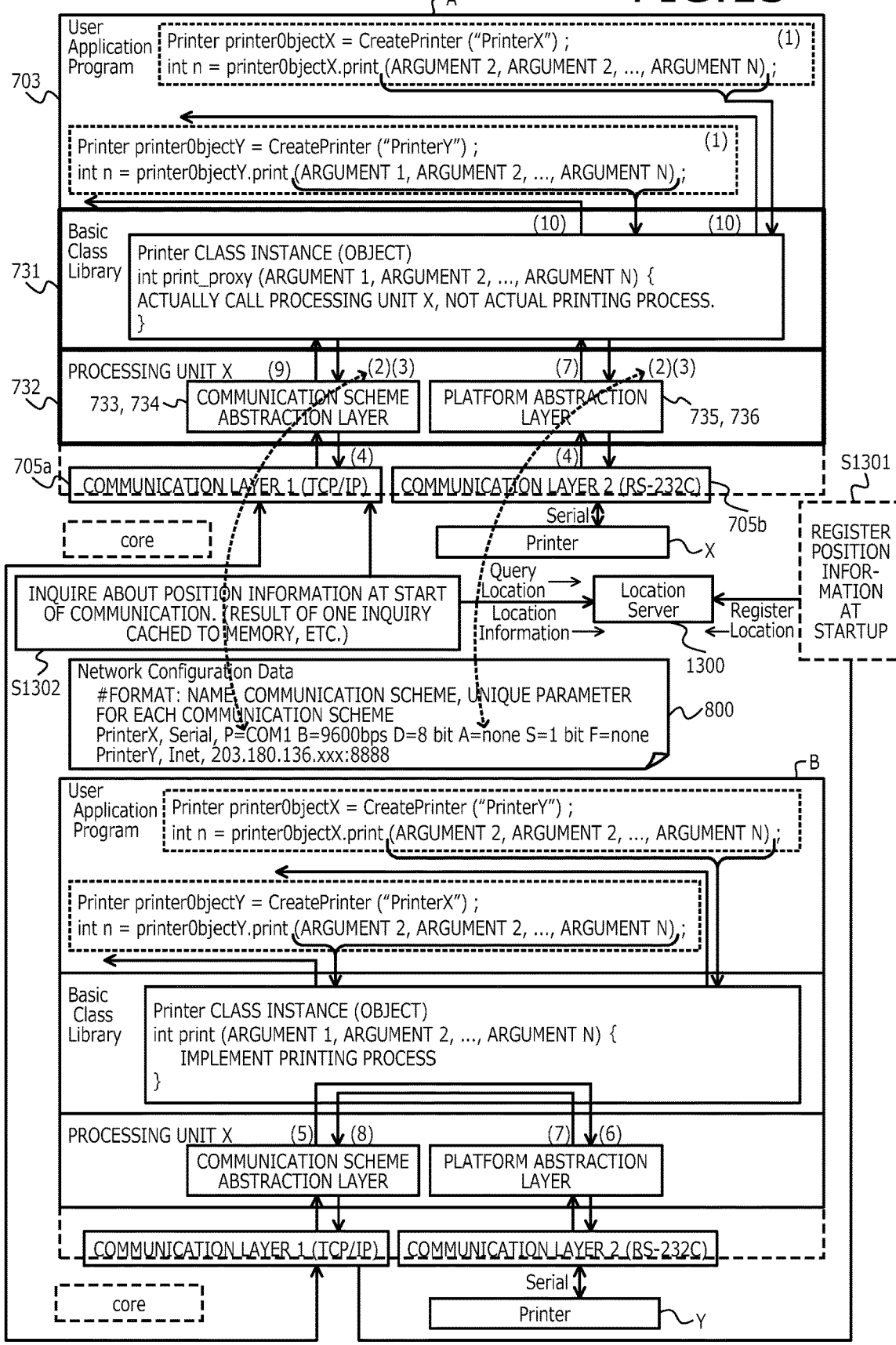

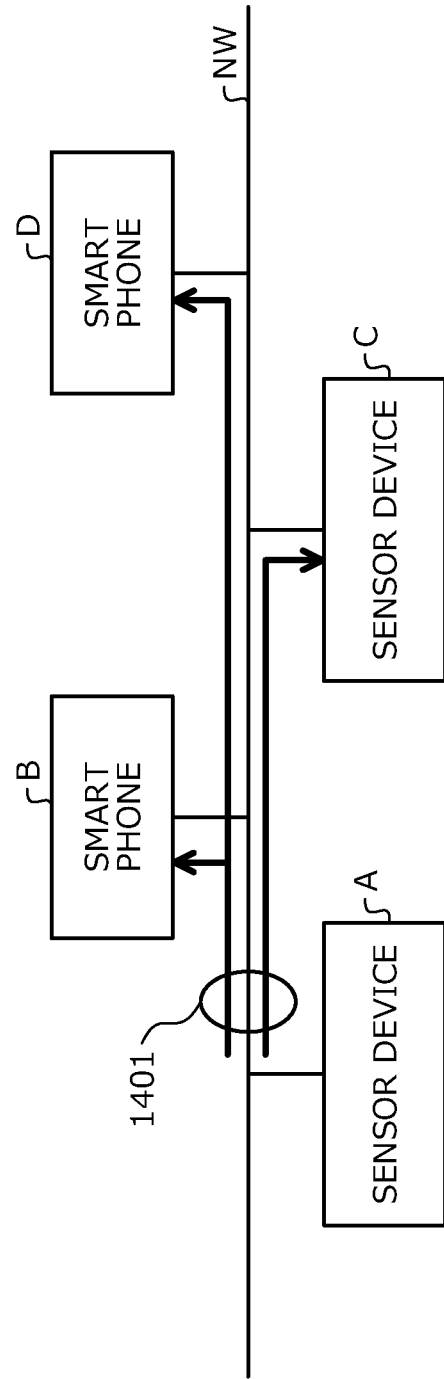

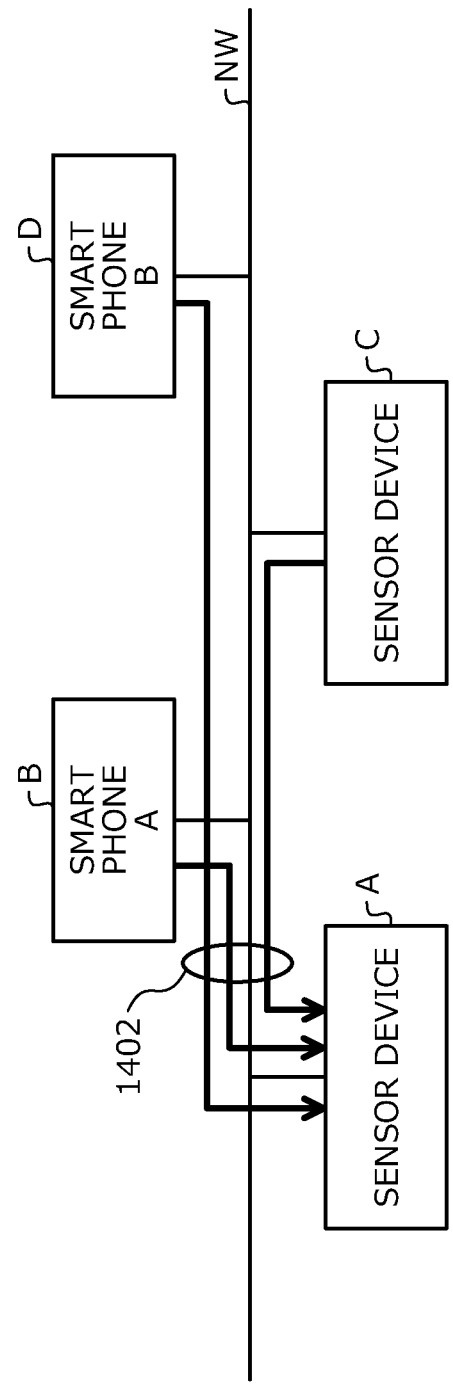

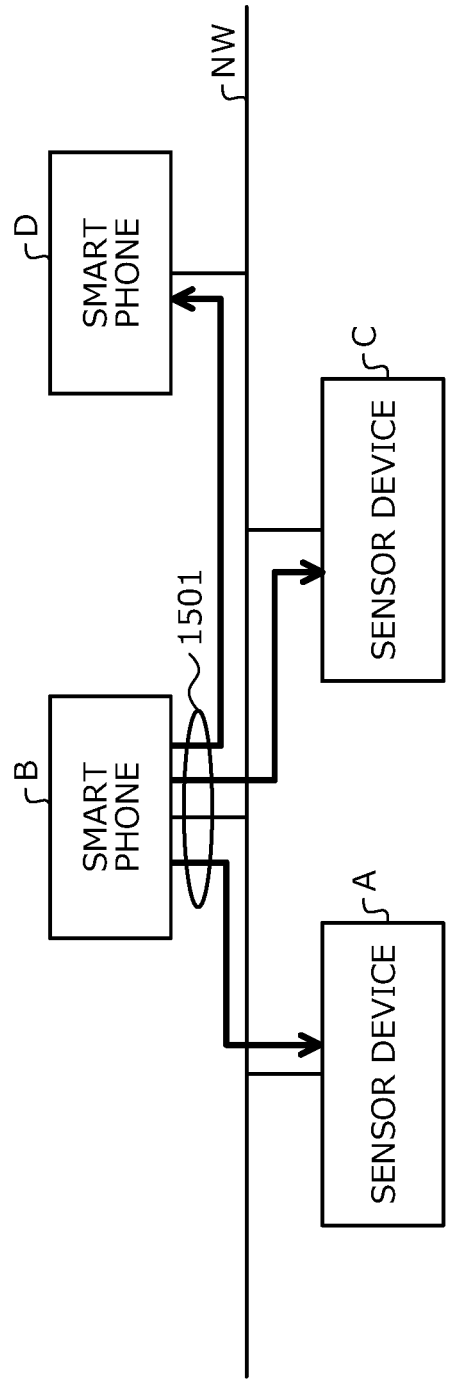

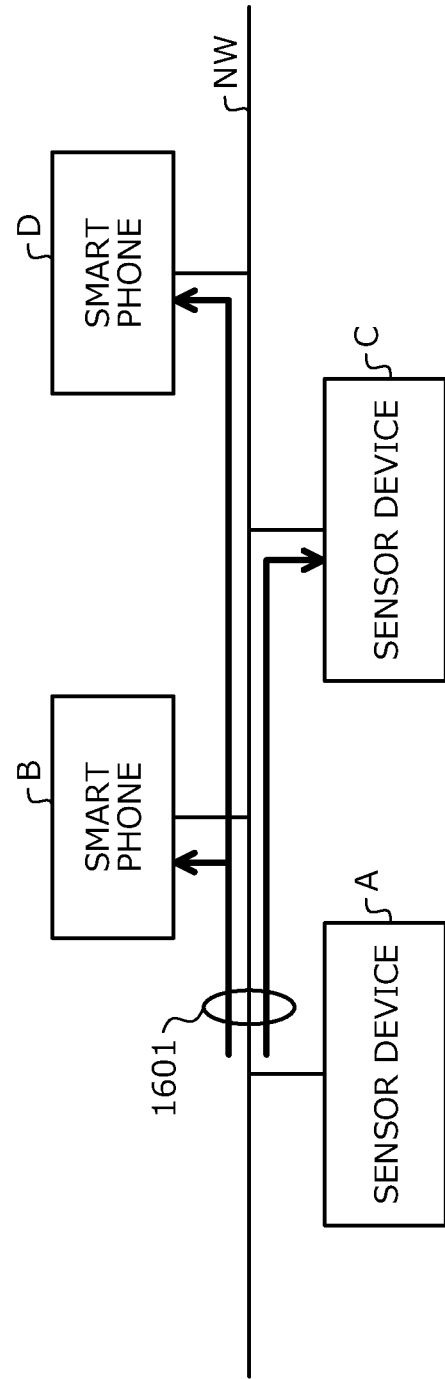

FIG.17A

```
/*ACCESS FROM APPARATUS A
TO DEVICE X*/
void main ()   {

/*APPARATUS X OPEN*/
int iX=Open_X () ;

/*ACQUIRE DATA FROM DEVICE
X*/
int idata=Read (X) ;
/*APPARATUS X CLOSE*/
Close_X () ;
}
```

CONTROL PROGRAM OF DEVICE X CONNECTED
TO CONTROL APPARATUS A

FIG.17B

```
/*ACCESS FROM APPARATUS A TO DEVICE Y*/
void main ()   {
/*COMMUNICATION OPEN*/         ~1001a
Open_com () ;
/*DEVICE Y OPEN*/
Int iY=Open_Y();
/*TRANSMIT REQUEST TO DEVICE Y*/  ~1001b
Send (iY) ;
/*ACQUIRE DATA FROM DEVICE Y*/
int idata= Receive (Y);  ~1002
/*DEVICE Y CLOSE*/
Close_Y () ;
/*COMMUNICATION CLOSE*/         ~1001c
Close_com () ;
}
```

CONTROL PROGRAM OF DEVICE Y CONNECTED
TO CONTROL APPARATUS B

DEVICE CONTROL APPARATUS, DEVICE CONTROL SYSTEM, DEVICE CONTROL METHOD, AND RECORDING MEDIUM

CROSS REFERENCE TO RELATED APPLICATIONS

This application is based upon and claims the benefit of priority of the prior Japanese Patent Application No. 2018-077195, filed on Apr. 12, 2018, the entire contents of which are incorporated herein by reference.

BACKGROUND OF THE INVENTION

1. Field of the Invention

Embodiments of the present invention relate to a device control apparatus, a device control system, a device control method, and a recording medium.

2. Description of the Related Art

According to a proposed conventional technique, devices connected to each other through a network or the like may mutually control each other (for example, refer to Japanese Laid-Open Patent Publication No. 2009-225481 below). Japanese Laid-Open Patent Publication No. 2009-225481 describes a technique in which devices connected to each other through a network are controlled using a predetermined protocol according to an energy conservation and homecare network (ECHONET) standard.

SUMMARY OF THE INVENTION

According to an embodiment of the present invention, a device control apparatus includes an object creating unit that creates an object to control a device connected to a control apparatus, or another device connected to another control device through a network; a communication processing unit that refers to a communication parameter of the device or the other device included in information related to the network and acquires information to access the object; a packet processing unit that converts the object into a predetermined packet, selects a port supporting a communication scheme, and outputs the packet; and a communicating unit that transmits the packet to the device or the other control apparatus to which the other device connected.

In the embodiment, the object creating unit creates an object constituted by a name, a function name, and argument information to control the device or the other device to be controlled; the communication processing unit refers to the communication scheme and the communication parameter of the device or the other device included in the information related to the network set in advance and acquires the information to access the object; and the packet processing unit converts the object name, the function name, and the argument information into a predetermined packet, selects a port that supports the communication scheme, and outputs the packet to the communicating unit.

In the embodiment, the communicating unit distributes on the network, the object name of the communicating unit when the control apparatus of the communicating unit participates on the network.

In the embodiment, the communicating unit, when the object desired by the control apparatus of the communicating unit is created, makes an inquiry to the other control apparatus about the object name through the network and acquires information related to the network from the other control apparatus that has the object name.

In the embodiment, the communicating unit distributes a name of a new object on the network when the control apparatus of the communicating unit adds the new object.

According to another embodiment of the present invention, a device control system controls a device connected to a control apparatus, or another device connected to another control apparatus. The control apparatus includes an object creating unit that creates an object constituting a name, a function name, and argument information to control the device or the other device to be controlled; a communication processing unit that refers to a communication scheme and a communication parameter of the device or the other device included in information that is preset and related to the network, the communication processing unit acquiring information to access the object; a packet processing unit that converts the object name, the function name, and the argument information into a predetermined packet, selects a port that supports the communication scheme, and delivers the packet; and a communicating unit that transmits the packet to the device or the other control apparatus to which the other device is connected.

In the embodiment, the control apparatus is connected to the other control apparatus through a network.

In the embodiment, the control apparatus and the other control apparatus are connected between CPUs in a single apparatus.

According to another embodiment of the present invention, a device control system in which a control apparatus controls another device connected by communication to another control apparatus, where the control apparatus includes an acquiring unit that is connected to the other control apparatus and that acquires control information of the other device controlled by the other control apparatus; an executing unit that, during predetermined control for the other device connected to the other control apparatus, executes a predetermined command having a format same as that of an interface in the control apparatus and an identifier other than that of the control apparatus attached thereto, the executing unit referring to the control information and transmitting to the other control apparatus, a request corresponding to the predetermined command, the executing unit using a response from the other control apparatus as a result for the executed command; and a communicating unit that transmits the request and receives a response to the request.

In the embodiment, the control apparatus is connected to the other control apparatus through a network.

In the embodiment, the control apparatus and the other control apparatus are connected between CPUs in a single apparatus.

According to another embodiment of the present invention, a device control method executed by a computer includes creating an object constituted by a name, a function name, and argument information to control a device connected to a control apparatus, or another device connected to another control apparatus through a network; referring to a communication scheme and a communication parameter of the device or the other device included in information related to the network and acquiring information to access the object; converting the object name, the function name, and the argument information into a predetermined packet, selecting a port that supports the communication scheme, and delivering the packet; and transmitting the packet to the device or the other control apparatus to which the other device is connected.

In the embodiment, the other control apparatus: recovers the object name, the function name, and the argument information from the received packet, executes a control process, and converts a return value of an execution result into a predetermined packet, and transmits the predetermined packet to the control apparatus. The control apparatus receives the return value transmitted by the other control apparatus.

In the embodiment, a server is disposed between the control apparatus and the other control apparatus. The control apparatus or the other control apparatus registers into the server, information related to a position of the object on the network. The control apparatus or the other control apparatus accessing the object makes an inquiry to the server about information related to a position of a control apparatus to be an access destination on the network and uses the information related to the position on the network to access the object of the desired control apparatus based on the information related to the position on the network acquired by the inquiry.

According to another embodiment of the present invention, a device control method in which a control apparatus controls another device connected to another control apparatus, is executed by a computer of the control apparatus and includes connecting to the other control apparatus and acquiring control information of the other device controlled by the other control apparatus; executing, during predetermined control for the other device connected to the other control apparatus, a predetermined command having a format same as that of an interface in the control apparatus and an identifier for that other than the control apparatus attached thereto; referring to the control information and transmitting to the other control apparatus, a request corresponding to the predetermined command; and using a response from the other control apparatus as a result for the executed command.

In the embodiment, control of the device connected to the control apparatus includes designating a connection port of the control apparatus, and control of the other device connected to the other control apparatus includes setting a port of a predetermined command corresponding to the control, as a port other than that of the control apparatus.

In the embodiment, the control information includes functions of the other device and identifiers of the functions. The control apparatus refers to the control information and transmits to the other control apparatus, information of an identifier corresponding to control of a desired function.

In the embodiment, the control apparatus acquires in advance control information related to the other device and stores and retains therein the control information.

In the embodiment, the control apparatus acquires control information related to the other device from the other control apparatus.

In the embodiment, the device control method further includes collecting control information of the other control apparatus by a server to which the other control apparatus is connected. The control apparatus acquires the control information of the other device from the server.

In the embodiment, the other control apparatus, when a request is issued from the control apparatus, designates a connection port to which the other device is connected, the other control apparatus designating the connection port based on the control information of the other device and controlling the other device.

According to another embodiment of the present invention, a non-transitory, computer-readable recording medium stores therein a device control program that causes a computer to execute a process that includes creating an object constituted by a name, a function name, and argument information to control a device connected to a control apparatus, or another device connected to another control apparatus through a network; referring to a communication scheme and a communication parameter of the device or the other device included in information that is preset and related to the network, and acquiring information to access the object; converting the object name, the function name, and the argument information into a predetermined packet, selecting a port that supports the communication scheme, and delivering the packet; and transmitting the packet to the device connected to the control apparatus or to the other control apparatus to which the other device is connected.

Objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a diagram of an overall configuration of a device control system;

FIG. 4A is a diagram of an example of a control program of the control apparatus;

FIG. 4B is a diagram of another example of the control program of the control apparatus;

FIG. 11 is a chart of an example of a definition of the disclosed interface capable of being remotely invoked;

FIG. 12 is an explanatory diagram of invocation of the disclosed interface of the application;

FIG. 13 is a diagram of an example of a configuration of a NAT traversal between the control apparatuses;

FIG. 14A is a diagram of an example of a notice by a newly participating control apparatus to other control apparatuses;

FIG. 14B is a diagram of an example of a notice by a newly participating control apparatus to other control apparatuses;

FIG. 15A is a diagram of an example of an inquiry from the control apparatus to another control apparatus;

FIG. 16 is a diagram of an example of a notice issued when the control apparatus newly adds a service;

FIG. 17A is a diagram of an example of a control process program of a conventional other apparatus connected through a network; and FIG. 17B is a diagram of an example of a control process program of the conventional other apparatus connected through a network.

DETAILED DESCRIPTION OF THE INVENTION

With the conventional technique, the control method, however, differs for control of a device connected to a control apparatus and control of another device connected to another control apparatus on the network. The control apparatuses are each configured to directly access and program devices. However, a communication program of the network has to be added for the control apparatus to control the other device connected to the other control apparatus through the network. For example, for the technique described in Japanese Laid-Open Patent Publication No. 2009-225481, a dedicated I/F is necessary for the communication between the networks because a dedicated protocol is used therein.

The control apparatus is a closed system that executes control for the device directly connected thereto, as above. Similarly, the other control apparatus is a closed system that executes control for the other device directly connected thereto. For device control across these closed systems, a communication processing program is separately necessary because network communication is mediated therebetween. A problem, therefore, arises in that the number of steps for the programming is significantly increased for the control apparatus to control the other device through the network.

When the control target is changed from the device connected to the control apparatus to another device on the network, another problem arises in that the number of steps for changing the program increases.

For example, it is assumed that control apparatuses A and B are each a control apparatus that includes a CPU and are connected to each other through a network, that the control apparatus A controls a device X (a home appliance 1) directly connected to the control apparatus A, that the control apparatus B controls a device Y (a home appliance 2) directly connected to the control apparatus B. It is also assumed that the control apparatus A controls the device Y (the home appliance 2). In this case, because the device Y (the home appliance 2) is controlled according to a program specific to the control apparatus B, the control apparatus A needs to add a communication program of the network to control the device Y (the home appliance 2). The control apparatus A has to execute program adjustment according to the program of the control apparatus B resulting in much work.

Embodiments of a device control apparatus, a device control system, a device control method, and a recording medium that stores a device control program according to the present invention will be described in detail below with reference to the accompanying drawings. The device control apparatus of the present invention corresponds to each of control apparatuses A and B described below.

Figure 1:
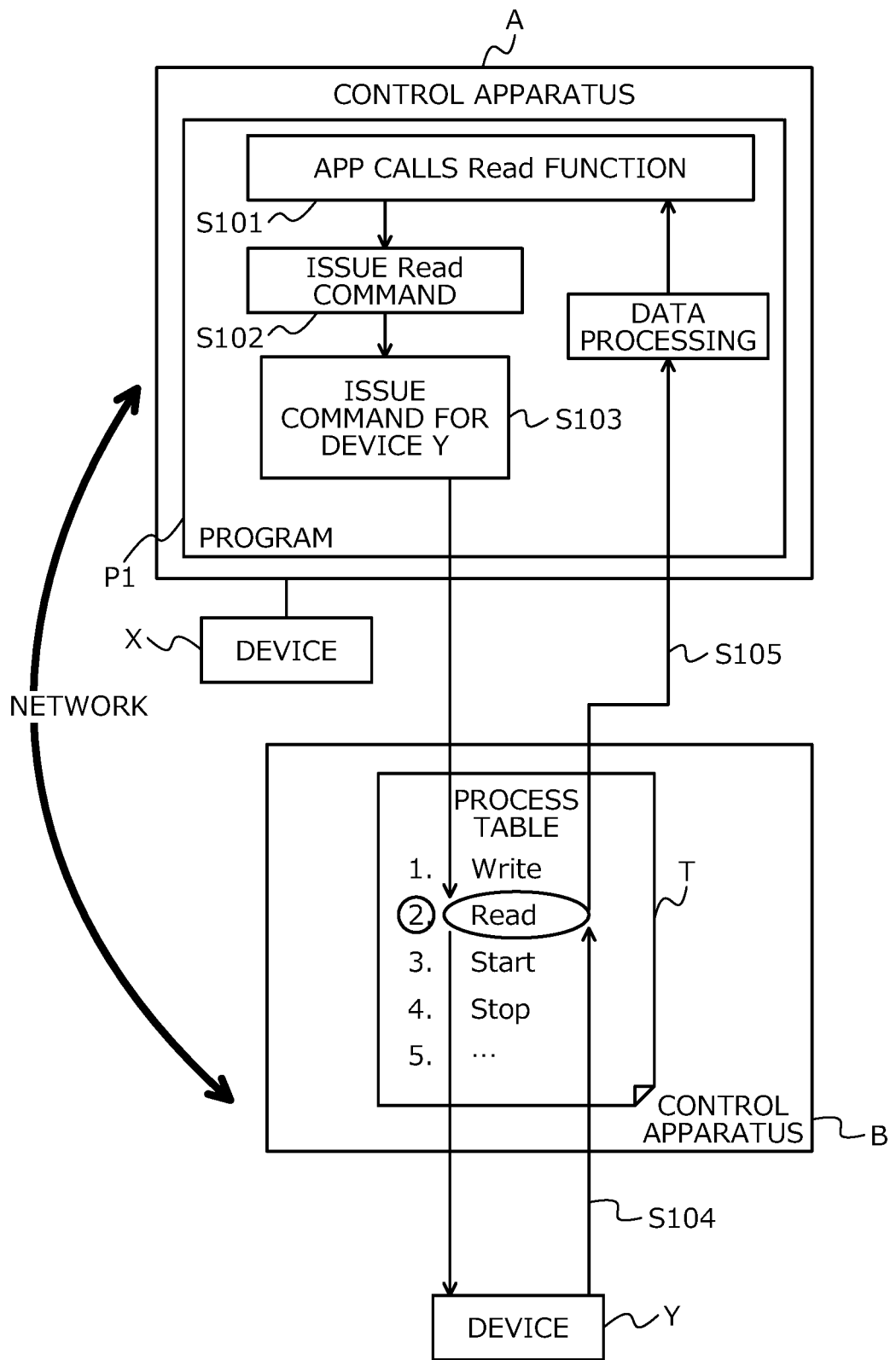
FIG. 1 is an explanatory diagram of an overview of access from a control apparatus to a device connected to another control apparatus.

FIG. 1 is an explanatory diagram of an overview of access from a control apparatus to a device connected to another control apparatus. An example will be described where a device X is connected to the control apparatus A, a device Y is connected to the control apparatus B, and the control apparatus A accesses the device Y through a network.

In the control apparatus A, a CPU executes a program P1 such as an application, whereby a process necessary for acquiring information related to the device Y connected to the control apparatus B (in the depicted example, to call a Read function) is performed (step S101) and a Read command is issued (step S102).

In a lower layer of the program P1 of the control apparatus A, a command for the device Y is interpreted, a process table T is referred to that shows control information related to the device Y, and a command to acquire the information related to the device Y is issued (step S103). The process table T is prepared in advance in the control apparatus B to which the device Y is connected.

At step S103, the control apparatus A refers to the process table T that is acquired from the control apparatus B or the like. The control apparatus A transmits the command issued at step S103 to the control apparatus B through a general-purpose communications I/F.

In this case, the control apparatus A does not transmit the command itself to control the device Y but interprets the command by referring to the process table T and transmits a request for control that corresponds to the command. The control apparatus B retains the process table T and is configured to execute the control that corresponds to the request transmitted from the control apparatus A by referring to the process table T.

The control apparatus B receives the Read command from the control apparatus A, acquires information from the device Y in response to the Read command (step S104), and transmits the information to the control apparatus A (step S105).

Figure 2A:
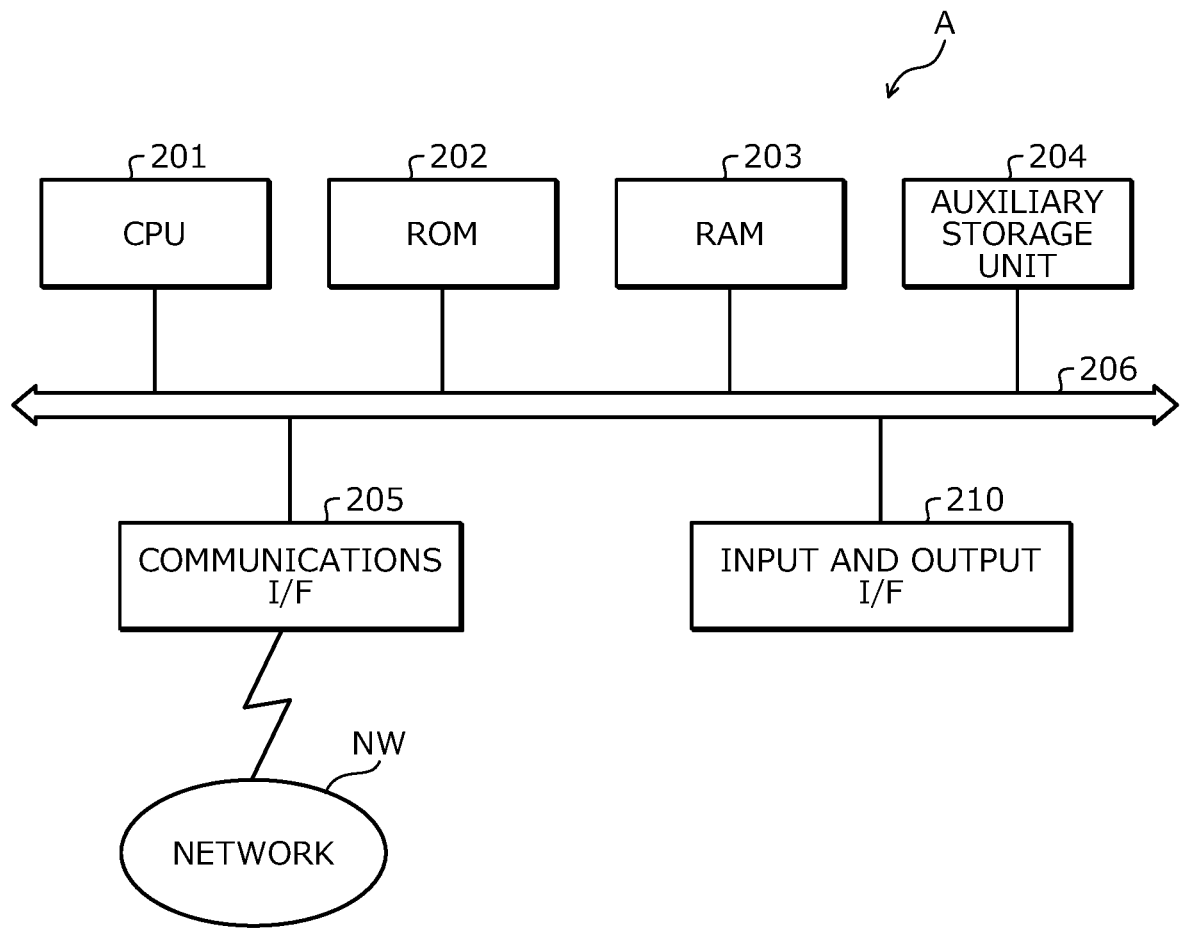
FIG. 2A is a block diagram of an example of a hardware configuration of the control apparatus.
Figure 2B:
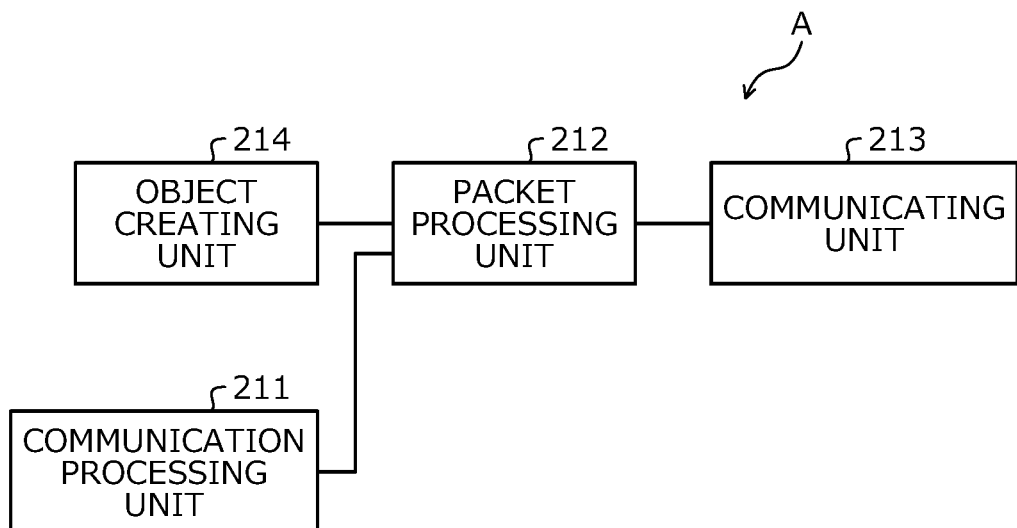
FIG. 2B is a functional block diagram of the control apparatus.

FIG. 2A is a block diagram of an example of a hardware configuration of the control apparatus. In FIGS. 2A and 2B, the control apparatus A includes a control unit (CPU) 201, a read-only memory (ROM) 202, a random access memory (RAM) 203, an auxiliary storage unit 204 such as a semiconductor memory or a disk drive, and a communications interface (I/F) 205. These components from the CPU 201 to the communication interface 205 are connected to each other by a bus 206.

The control apparatus A is connected to the device X that is an apparatus to be controlled through the bus 206. The control apparatus A may be connected to the device X through the communications I/F 205 or an input and output I/F 210.

The input and output I/F 210 may be connected to a display, a keyboard, a mouse, a scanner, a printer, and the like.

The CPU 201 is a computing control apparatus that supervises control of the control apparatus A overall. The ROM 202 is a non-volatile memory storing therein a program for the control apparatus A, and the like. The RAM 203 is a volatile memory that is used as a work area of the CPU 201 when the CPU 201 executes a computing process of the program.

The communications I/F 205 administers an internal interface with a network NW, and controls the input and output of data with respect to the control apparatus B. For example, the communications I/F 205 is connected to a local area network (LAN), a wide area network (WAN), the Internet, or the like to be the network NW, through a communication line, and is connected to the control apparatus B through the network NW. For example, a router, a modem, a LAN adaptor, or the like may be employed as the communications I/F 205.

The CPU 201 depicted in FIG. 2A executes the program P1 stored in the ROM 202, uses the RAM 203 as the work area at this time and thereby, may execute the processing depicted in FIG. 1.

The control apparatus B may also be configured similarly to the control apparatus A using the hardware depicted in FIG. 2A. In this case, the RAM 203 (or the auxiliary storage unit 204) depicted in FIG. 2A retains the process table T depicted in FIG. 1.

FIG. 2B is a functional block diagram of the control apparatus according to the embodiment. The control apparatus A includes an object creating unit 214, a communication processing unit 211, a packet processing unit 212, and a communicating unit 213. The control apparatus B also has similar functions as those of the control apparatus A.

The object creating unit 214 creates an object to control the device X connected to the control apparatus A, or to control the other device Y connected to the other control apparatus B through the network. For example, the object creating unit 214 creates an object that includes a name, a function name, and argument information to control the device X or the other device Y to be controlled.

The communication processing unit 211 refers to communication parameters of the device X or the other device Y included in the information regarding the network NW and thereby acquires information to access the created object. For example, the communication processing unit 211 refers to the communication scheme and the communication parameters of the device X or the other device Y included in the information regarding the network NW set in advance and thereby acquires the information to access the object.

The packet processing unit 212 converts the created object into a predetermined packet, selects a port that supports the communication scheme, and outputs the packet therefrom. For example, the packet processing unit 212 converts the object name, the function name, and the argument information into the predetermined packet, selects the port that supports the communication scheme, and outputs the packet to the communicating unit 213.

The communicating unit 213 transmits the packet to the corresponding device X or the other control apparatus B to which the other device Y is connected. The communicating unit 213 distributes the object name of the communicating unit 213 on the network NW when the control apparatus A of the communicating unit 213 participates on the network NW. When an object desired by the control apparatus A of the communicating unit 213 is created, the communicating unit 213 makes an inquiry on the network NW about the object name, and acquires the information regarding the network NW from the other control apparatus B that retains the object name. When the control apparatus A of the communicating unit 213 adds a new object, the communicating unit 213 distributes the corresponding object name on the network NW.

FIG. 3 is a diagram of an overall configuration of a device control system. In a device control system 300, the control apparatus A and the control apparatus B are connected to each other through the network NW.

The device X is connected to the control apparatus A and the control apparatus A controls the device X. The device Y is connected to the control apparatus B and the control apparatus B controls the device Y.

The control apparatus A may have plural control apparatuses B connected thereto through the network NW. The control apparatuses B may each have plural devices Y such as those having different functions, connected thereto. The control apparatuses B and the devices Y may each be identified using an ID specific thereto.

The control apparatus A directly controls the device Y that is connected to any one of the control apparatuses B through the network NW. The control apparatus A and the control apparatuses B each includes a general-purpose communications I/F connectable to the network NW and a communication program.

FIGS. 4A and 4B are diagrams of examples of a control program of the control apparatus. FIG. 4A depicts an example of the control program of the device X connected to the control apparatus A. FIG. 4B depicts an example of the control program of the device Y connected to the control apparatus B.

The content of the control indicated by the program P1 in FIG. 4A and that in FIG. 4B are identical. As above, for the control apparatus A, the content of the program is the same regardless of whether the device X and the device Y to be controlled are connected to the control apparatus (the control apparatus A).

Therefore, when a programmer creates the program P1 of the control apparatus A, the programmer may create the program P1 without being conscious about processing necessary for communication between the control apparatus A and the control apparatus B at the device X and the device Y.

When a change is made to the hardware in response to a failure, a functional change, or the like of the device X or the device Y connected to the control apparatus A or the control apparatus B, this change may be coped with by merely changing the process table T of the control apparatus B. In this case, changes to the program P1 (the software in the application layer) depicted in FIG. 4 become unnecessary.

Figure 5:
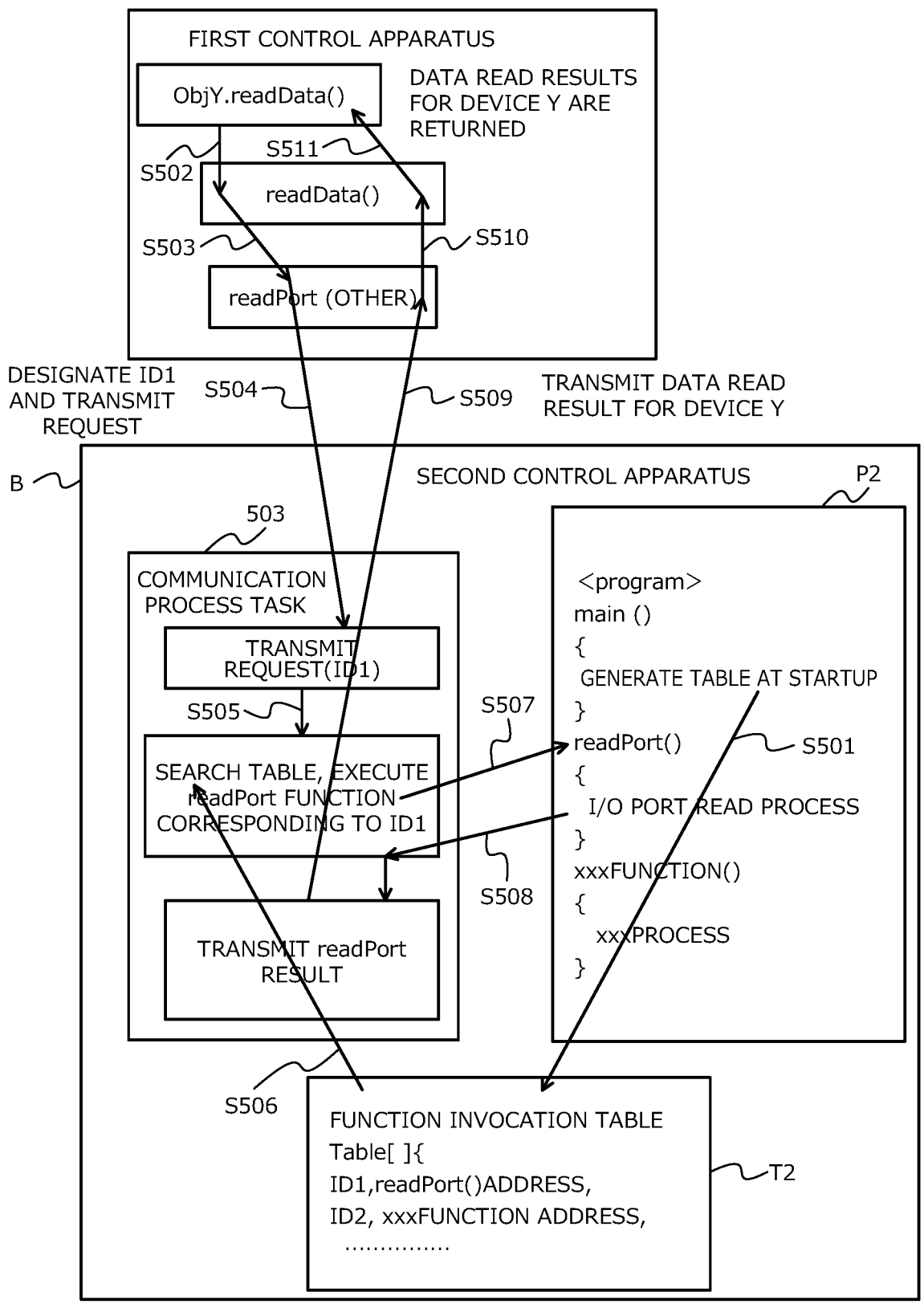
FIG. 5 is an explanatory diagram of a specific example for the control apparatus to access a device of another control apparatus.

FIG. 5 is an explanatory diagram of a specific example for the control apparatus to access a device of another control apparatus. In this example, in the control apparatus B to which the device Y is connected, a program P2 creates a function invocation table T2 as the process table T when the program P2 is started up. The function invocation table T2 may be created at an arbitrary timing without limitation to the timing to the time of the startup of the program P2, and configuration may such that the function invocation table T2 is manually created and input from an external source.

The program P2 has a process of creating the function invocation table T2 at the time of startup of the program P2, a process of acquiring the information related to the device Y (readPort), and a process of executing predetermined function computation and the like for the read information, described (set) therein.

The function invocation table T2 includes an ID (ID1) of the device Y and the address of the port of the control apparatus B to which the device Y is connected. In this example, the ID1 has the address of "readPort" to read the information from the device Y, set therein. In addition, as depicted in the process table T of FIG. 1, in the function invocation table T2, the control functions may be set for each ID, such as writing (Write), starting-up (Start), and stopping (Stop).

The setting of the function invocation table T2 is not limited to a character string like "readPort" as depicted in FIG. 5, and may be a number string like "1001" to the effect that the port is read.

A communication process task 503 executes a communication process (reception and transmission) of the communication with the control apparatus A for the network NW and, when a request is issued from the control apparatus A to the device Y, searches the function invocation table T2 that uses the corresponding ID and executes the function computation of the program P2 according to the request.

The procedure for an access from the control apparatus A to the device Y according to the embodiment will sequentially be described below. When the program P2 of the control apparatus B starts up, the control apparatus B first creates the function invocation table T2 (step S501).

At this step, the program P2 of the control apparatus B detects the connection port of the device Y connected to the control apparatus B, and creates a setting having the ID of the function of reading the information correlated therein with the address of "readPort", in the function invocation table T2. Similarly, the control apparatus B sets a predetermined ID (an ID2 in the depicted example) in the function invocation table T2 for the functions of the control executable by the control apparatus B (such as function computation).

The control apparatus A acquires at an arbitrary timing, the function invocation table T2 created by the control apparatus B. As to the timing of acquiring the function invocation table T2 by the control apparatus A, the control apparatus A directly accesses the control apparatus B and acquires the function invocation table T2 when the control apparatus A knows the functions of the device Y, the location and the like of the control apparatus B to which the device Y is connected.

The control apparatus B may disclose the function invocation table T2 on the network NW. In this case, configuration may be such that, of the control apparatuses A that refer to the disclosed function invocation table T2, the control apparatus A desiring to control the device Y (requesting acquisition of the information) accesses the control apparatus B and acquires the disclosed function invocation table T2.

It is assumed that the control apparatus A thereafter executes control to acquire the information related to the device Y from the control apparatus B (step S502). For example, the program P1 of the control apparatus A executes the process necessary for the acquisition of the information related to the device Y (ObjY.readData ( )).

In this case, the program P1 of the control apparatus A issues a read command (readData ( )) for the device Y (step S503). The lower layer of the program P1 of the control apparatus A interprets the command for the device Y, refers to the function invocation table T2 acquired from the control apparatus B, designates an identifier ID1 that corresponds to the acquisition of the information related to the device Y, and transmits a request ID1 that corresponds to a command (readPort (other)) to acquire the information related to the device Y to the control apparatus B (step S504). "other" refers to a port of the other control apparatus B.

At this step, the control apparatus A does not transmit to the control apparatus B, the command itself to control the device Y but only has to refer to the function invocation table T2 to thereby transmit only the identifier ID that includes the content of the control. Therefore, the amount of data to be transmitted may be reduced.

Figure 6:
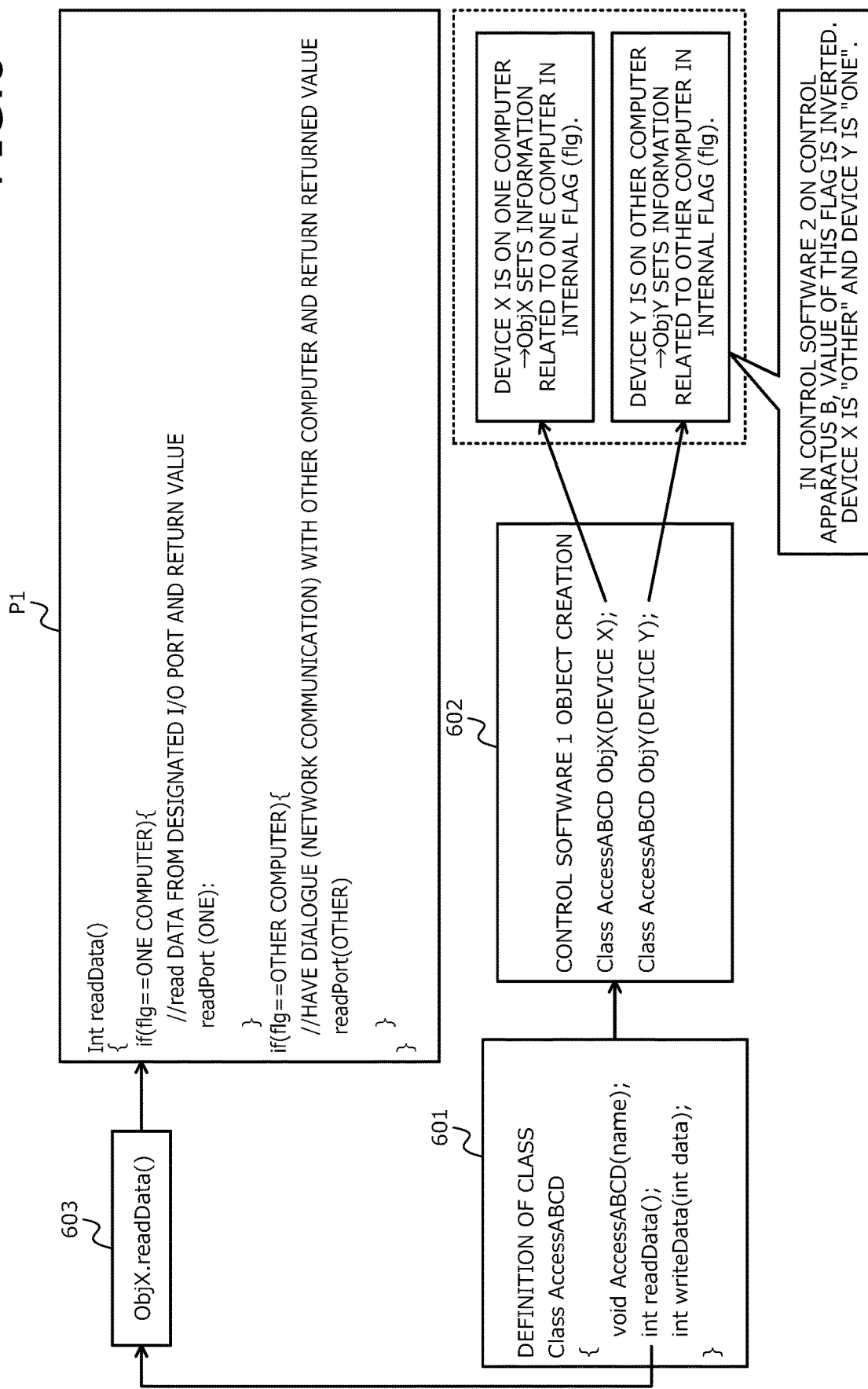
FIG. 6 is a diagram of a specific example of creation of a program in a built-in device.

FIG. 6 is a diagram of a specific example of creation of a program in a built-in device. The control apparatus A and the control apparatus B of the embodiment function as control units for the specific-use devices X and Y whose uses (operations) are each limited to a built-in device such as, for example, a remote controller, a digital camera, an IC recorder, an in-vehicle apparatus, a medical apparatus, a surveillance camera, or a break-in detector.

The program P1 depicted in FIG. 6 has an object 602 and a command 603 of control software 1 of the control apparatus A defined therein based on a definition 601 of the class. The apparatus of the object 602 (the device X) is indicated to be on one computer (the control apparatus A), and "ObjX" sets the information related to the one computer in a flag (flg) therein. The apparatus of the object 602 (the device Y) is indicated to be on the other computer (the control apparatus B), and "ObjY" sets the information related to the other computer in a flag (flg) therein.

When the command 603 to read (readData) is for the one computer (the control apparatus A), the program P1 executes "read" for the data from the designated one interface (an I/O port) and returns the value thereof. When the command 603 to read (readData) is for the other computer (the control apparatus B), the program P1 has a dialogue with the corresponding control apparatus B and returns the returned value.

As depicted in FIG. 5, in the control apparatus B, the communication process task 503 receives the request ID1 from the control apparatus A (step S505). The communication process task 503 refers to the function invocation table T2 (step S506) and causes the program P2 to execute the function (readPort) that corresponds to the identifier ID1 (step S507).

In the control apparatus B, the program P2 thereafter executes the I/O port read process in response to ID1, reads the information related to the corresponding device Y (readPort), and returns the information to the communication process task 503 (step S508).

In the control apparatus B, the communication process task 503 transmits to the control apparatus A, the information related to the device Y read as the result of readPort (step S509).

The control apparatus A converts the information transmitted from the device Y as a response to "readPort (other)" issued by the program P1 into "readData ( )" (step S510) and acquires the information related to the corresponding device Y as the result of the process (ObjY.readData ( ) necessary for acquiring the information related to the device Y (step S511).

According to the above processes, the control apparatus A determines whether the process is a process to be executed in the control apparatus A or a process to be executed in the control apparatus B based on the argument (the name of the access target) designated by the program P1. In this case, for an access to an external apparatus (the control apparatus B), the control apparatus A refers to the function invocation table T2 acquired in advance and accesses the corresponding control apparatus B.

The communication process task 503 and the function invocation table T2 of the control apparatus B may be configured using a hardware chip not limiting these to those executed using the software.

The function invocation table T2 may be configured to be disclosed on the network NW by the control apparatus B, without limitation to the function invocation table T2 that is acquired by the control apparatus A as above. The functions of the device Y (Read, Write, Start, and Stop) indicated in the function invocation table T2 may be acquired by an arbitrary control apparatus A on the network NW and may be controlled (used).

The control apparatus A may learn the functions of the device Y connected to the control apparatus B by acquiring the function invocation table T2, and the control apparatus A may control the device Y connected to the control apparatus B concealing the communication scheme (the procedure) of the network NW.

Even when the device X and the device Y are installed in a single room or at separate locations, the control apparatus A may thereby control the device Y without any limitation on the installation places.

For example, the control apparatus A may control different monitoring functions of the device Y and the device X having different functions, the devices X and Y being disposed in a single room. On the other hand, the control apparatus A may perform a computation-process for computation not processable by the control apparatus A, by using the control apparatus B in a remote place under the control of the control apparatus A.

The function invocation table T2 of the control apparatus B may be retained in a server on the network NW and may be retained as the function invocation table T2 for each of the plural control apparatuses B. The control apparatus A requesting a predetermined function may thereby easily search for the corresponding function (the device Y) by accessing the server. The control apparatus A may easily access the control apparatus B to which the device Y is connected.

According to the embodiment, the control apparatus A and the control apparatus B may each easily control the device X and the device Y connected to the control apparatus A or B, or another control apparatus without depending on the CPU and the OS that execute the process and regardless of presence or absence of a network connection.

The control apparatus A may similarly execute reading and writing with respect to the memory not included in the control apparatus A and may execute the function. The control apparatus A and the control apparatus B are therefore applicable also to communication between different CPUs in a single apparatus not limiting CPUs to those connected through a network.

Not limiting the control to the closed control for the device X connected to the control apparatus A, the control apparatus A may thereby also control the other device Y connected to the other control apparatus B through the network without being conscious about the communication (the protocol) and may also easily create the program because the control apparatus A may create the program without being conscious about the communication. The control apparatus A may control the device Y of the other control apparatus B without adding a communication program or a dedicated I/F of the network mediating therebetween.

The function invocation table T2 is updated when the device Y connected to the control apparatus B is replaced due to a failure or a specification change thereof or a device Y is added. The control apparatus A may thereby control the desired device Y by merely referring to the function invocation table T2 even when the function of the device Y is changed, and enables a change of the program to be unnecessary even when the device Y is replaced or the like.

Similar to the control apparatuses A and B, a built-in device having a function for a specific use may expand its function by executing control for the other apparatus. Similar to the control apparatuses A and B, an information control apparatus such as a general-purpose PC may easily control the devices X and Y each having a desired function. For example, the built-in device and the information control apparatus may control any other arbitrary devices X and Y without being bound by the standards such as ECHONET and AUTOSAR even when no dedicated I/F and no dedicated communication program are provided.

Figure 7:
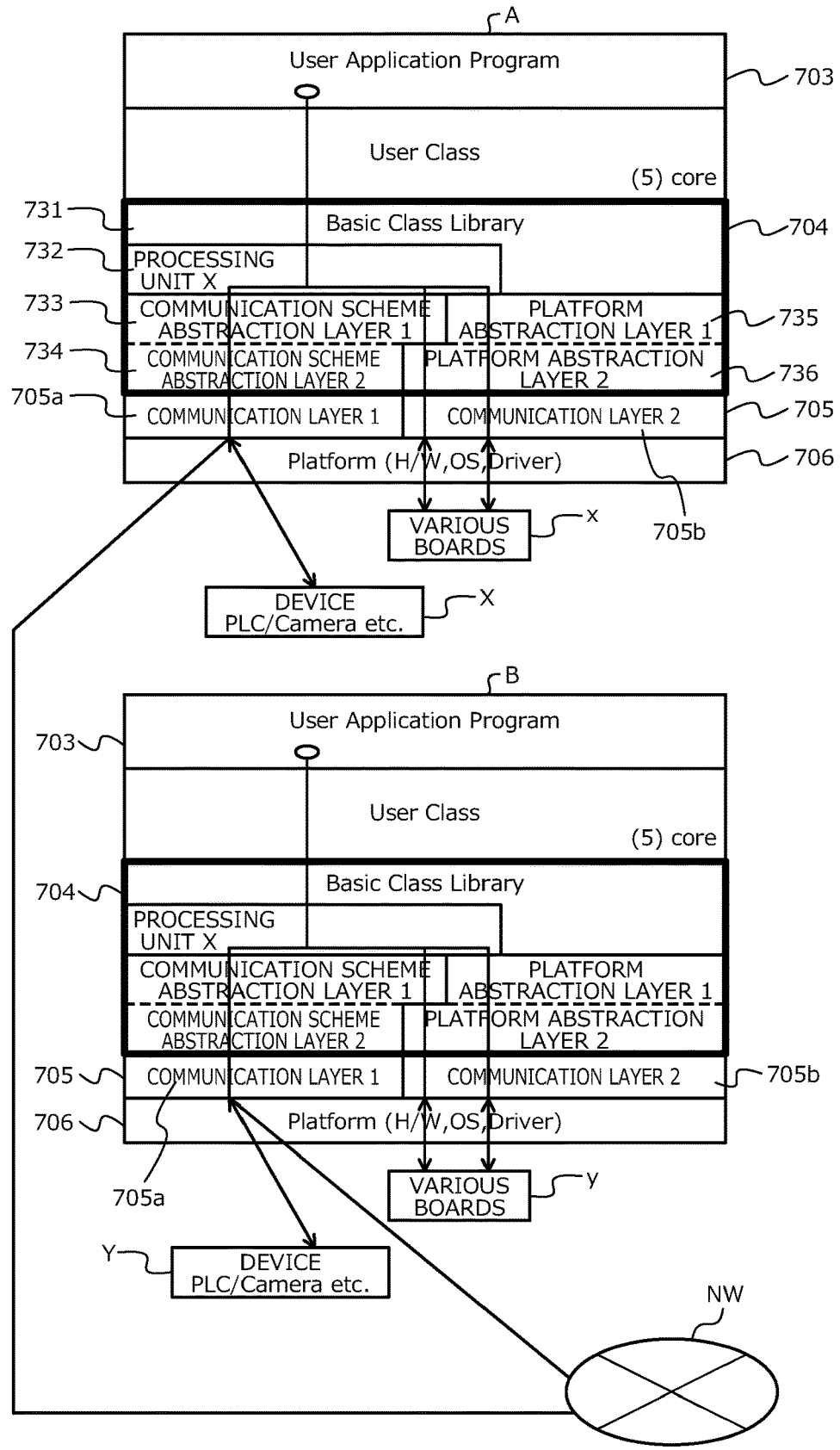
FIG. 7 is a diagram of a specific example of an access to devices connected to different control apparatuses.

FIG. 7 is a diagram of a specific example of an access to devices connected to different control apparatuses. The control apparatus A and the control apparatus B each include an application program 703, a core layer 704, an implementing unit 705 for processing accesses to a communicating apparatus executing communication with the outside and a board in the apparatus, and a platform (hardware, an OS, and a driver) 706.

A communication layer 1 (705a) of the control apparatus A accesses the device X directly connected to the control apparatus A and, in addition, may access the device Y of the control apparatus B through a network 710. A communication layer 2 (705b) may access a board x and the like in the control apparatus A. Similarly, a communication layer 1 (705a) of the control apparatus B accesses the device Y directly connected to the control apparatus and, in addition, may access the device X of the control apparatus A through the network 710. A communication layer 2 (705b) thereof may access a board y and the like in the control apparatus B.

The core layer 704 includes a Basic Class Library 731, a processing unit X732, a communication scheme abstraction layer 1 (733), a communication scheme abstraction layer 2 (734), a platform abstraction layer 1 (735), and a platform abstraction layer 2 (736). The Basic Class Library 731 manages plural objects such as, for example, various types of objects such as those for an I/O process, a real-time monitor, an event monitor, an abnormality monitor, data collection, and a collective setting.

The processing unit X732 executes the processes of the following types 1) to 3) in response to the process concerning the object called from the Basic Class Library 731.

1. For a process requested by the application program to an object, it is checked whether the object is present in the application program, on a LAN, or on a WAN.

2. The processing unit X732 executes a process of extracting the actual state of "Name (name)" designated in each process request invoked from the application program through the Basic Class Library 731. The actual state of the name is set in advance on the network setting.

3. When the object is present on the LAN or the WAN, the processing unit X732 secures the communication path for the object, and transmits and receives requests.

The communication scheme abstraction layer 1 (733) is an I/F to abstract the communication process called from the processing unit X732. The functions of the communication scheme abstraction layer 1 (733) each calls the function of the communication layer 1 (705a) that has an individual communication process for each access target implemented therein.

The platform abstraction layer 1 (735) is an I/F to abstract the platform-dependent process called from the Basic Class Library 731. From the functions of the platform abstraction layer 1 (735), a function of the communication layer 2 (705b) having a process for an individual access to each access target, an RTOS process of adapting the functions presented by the OS to realize the functions, and the like implemented therein is called.

The communication layer 1 (705a) is an implementing unit of an individual communication process for each access target called from the communication scheme abstraction layer 2 (734). The communication layer 1 (705a) identifies an access target using an argument (handle) delivered through the processing unit X732 to the communication scheme abstraction layer 1 (733) to the communication scheme abstraction layer 2 (734), and executes the corresponding implementation process.

The communication layer 2 ((705b) is an implementing unit that creates the process for an individual access each access target called from the platform abstraction layer 2 (736), the RTOS process of adapting the functions presented by the OS to realize the functions, and the like. The communication layer 2 (705b) identifies the access target using an argument (handle) delivered through the processing unit X732 to the platform abstraction layer 1 (735) to the platform abstraction layer 2 (736) to execute the corresponding implementation process.

Figure 8:
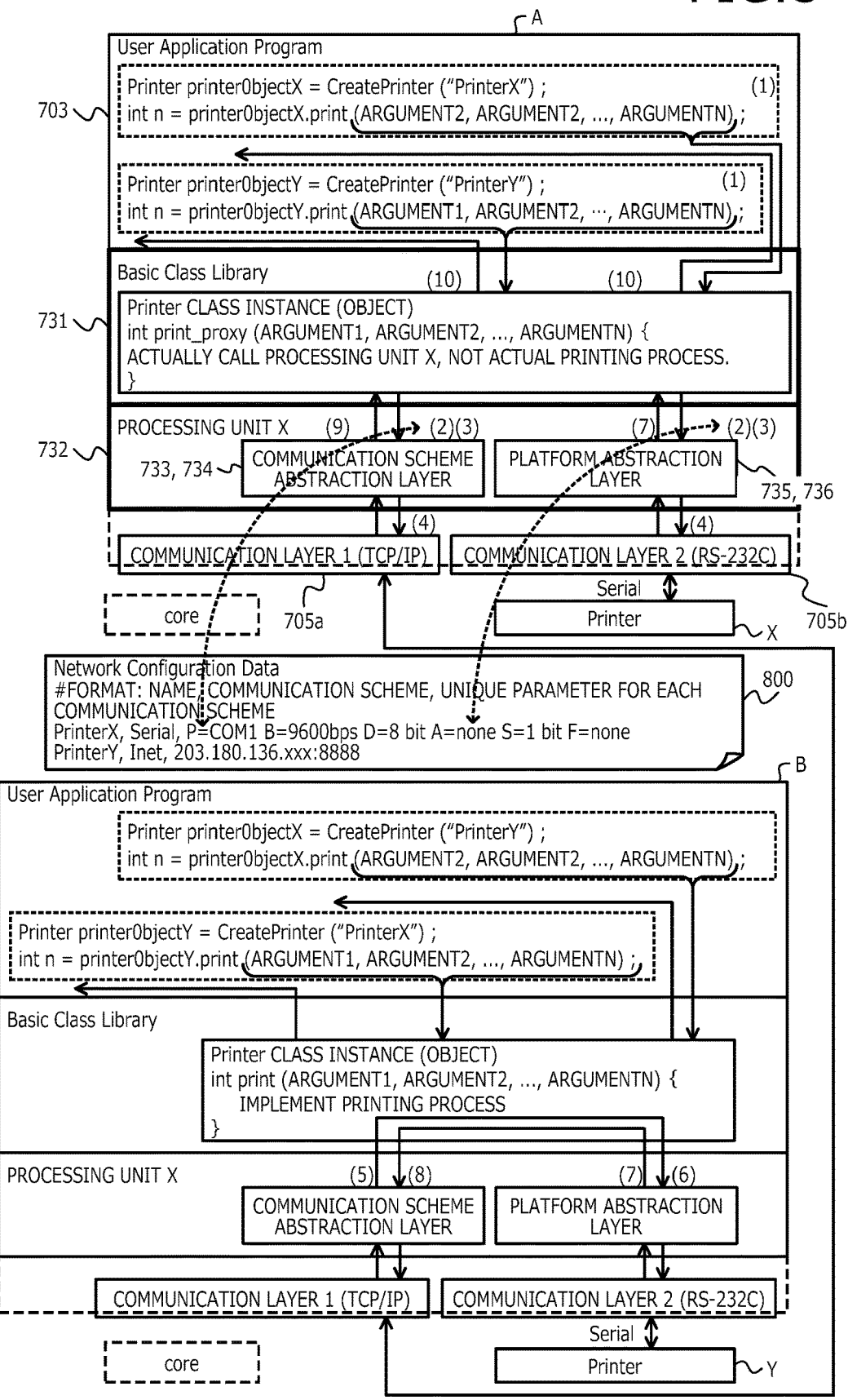
FIG. 8 is an explanatory diagram of reading an object of another control apparatus.

FIG. 8 is an explanatory diagram of reading an object of another control apparatus. The process will be described below according to the flow sequence taking an example of a printer with which the devices X and Y each execute a printing process.

1. The control apparatus A first designates a name using the application program 703, creates an object, and invokes a function retained by the object.

2. Using the processing unit X732, the control apparatus A solves the communication scheme and the communication parameters (position information) to access the object using the object name based on the content of Network Configuration Data 800.

3. 4. Using the processing unit X732, the control apparatus A converts the object name, the function name, and the argument information into a packet and delivers the packet to a port that has the communication scheme solved at "2." implemented therein, through the abstraction layers 733 to 736. In this case, predetermined encryption is applied to the packet leaving the control apparatus A.

5. Using the processing unit X732, the control apparatus B receives the packet and decrypts the encrypted packet. The control apparatus B further recovers the object name, the function name, and the argument information from byte data and invokes the actual state of the printing process.

6. The actual printing is executed through the platform abstraction layer 1 (735)/the platform abstraction layer 2 (736) as the actual state of the printing process of "5.".

7. The platform abstraction layer 1 (735)/the platform abstraction layer 2 (736) of the control apparatus B each receives a return value that is the result of the printing process.

8. The communication scheme abstraction layer 1 (733)/the communication scheme abstraction layer 2 (734) of the control apparatus B each converts the return value into a packet, each encrypts the packet, and each transmits the encrypted packet to the invocation source (the control apparatus A).

9. The processing unit X732 of the control apparatus A receives the packet that includes the return value, and decrypts the encrypted packet.

10. The Basic Class Library 731 of the control apparatus A returns the return value to the invocation source (the application program 703).

In the above process, when the application program 703 of the control apparatus A accesses a printer X connected to the control apparatus A and executes the printing process, the application program 703 executes the processes of "1., 2., 3., 4., 7., and 10." in FIG. 8. In this case, the processing unit X732 of the control apparatus A solves the connection destination based on information related to a serial port of the printer X connected to the control apparatus A using the Network Configuration Data 800 for the actual state of the name.

When the application program 703 of the control apparatus A accesses a printer Y connected to the other control apparatus B and causes the printer Y to execute the printing process, the application program 703 sequentially executes the processes at "1. to 10." in FIG. 8. In this case, the processing unit X732 of the control apparatus A solves the connection destination based on the connection method (the position information such as the external communication and the address) to the control apparatus B using the Network Configuration Data 800 for the actual state of the name.

While an example of the control of the devices X and Y respectively connected to the different control apparatuses A and B has been described in the above description, without limitation hereto, the example is also applicable to control of the communication between different CPUs A and B.

Figure 9:
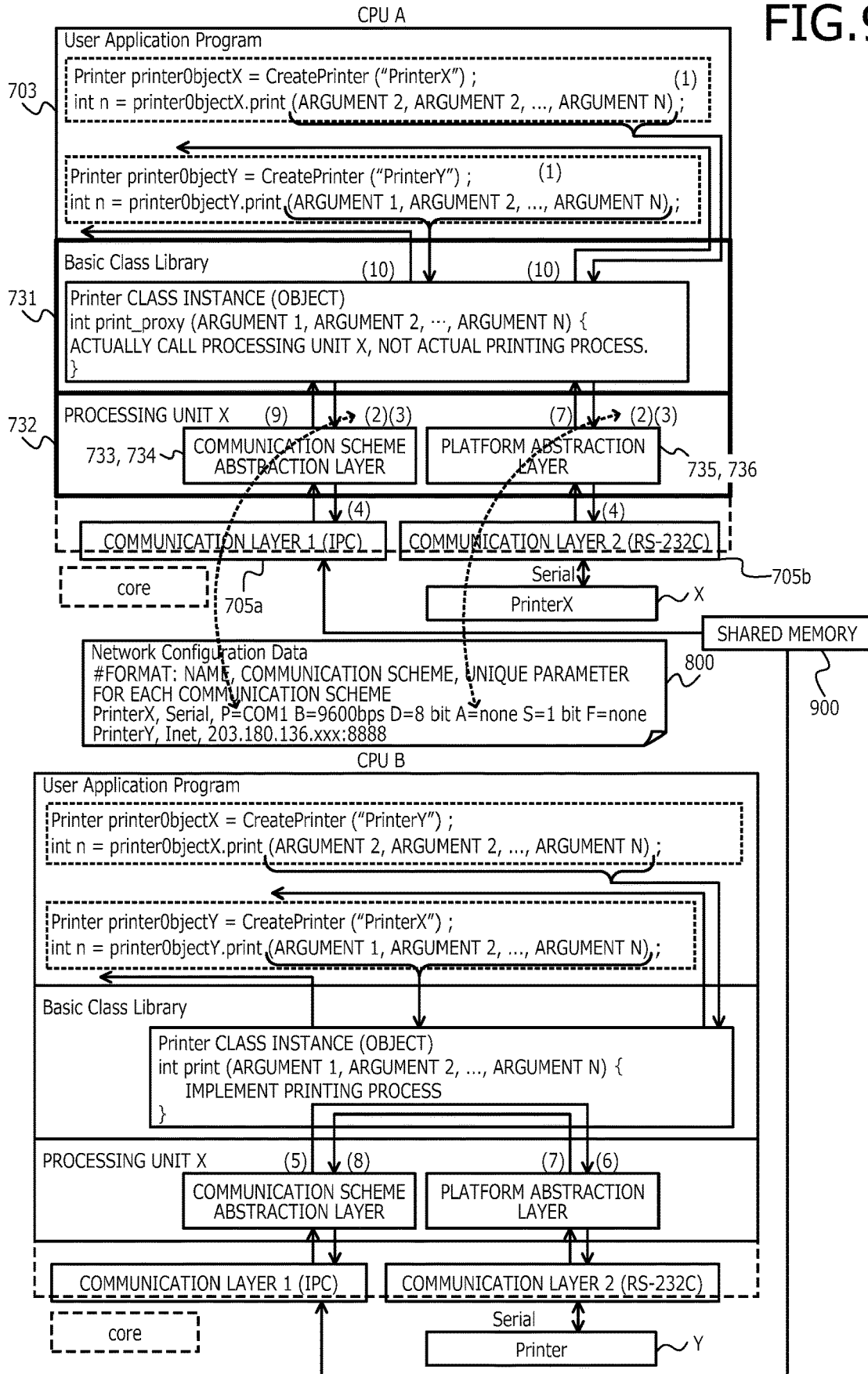
FIG. 9 is a diagram of an example of a configuration in which different CPUs each transmit and receive data using a shared memory.

FIG. 9 is a diagram of an example of a configuration in which different CPUs each transmit and receive data using a shared memory. Invocation of functions is also enabled between the CPUs A and B in a single apparatus through a shared memory 900. For example, when an application program 703 of the CPU A accesses a printer Y connected to the other CPU B and causes the printer Y to execute a printing process, the application program 703 sequentially executes the processes at "1. to 10." depicted in FIG. 8 through the shared memory 900. A processing unit X732 of the CPU A solves the connection destination based on the connection method (the information related to the external communication and the CPU B) to the CPU B using the Network Configuration Data 800 for the actual state of the name.

This case may be supported by merely replacing the communication scheme abstraction layer 1 (733) and the communication scheme abstraction layer 2 (734) of each of the CPU A and the CPU B with a porting layer to be implemented through the shared memory 900. The application program 703 of the control apparatus A may seamlessly execute the processes in a completely identical manner as that of the example for the case where the processes are executed through the network as depicted in FIG. 8.

Figure 10:
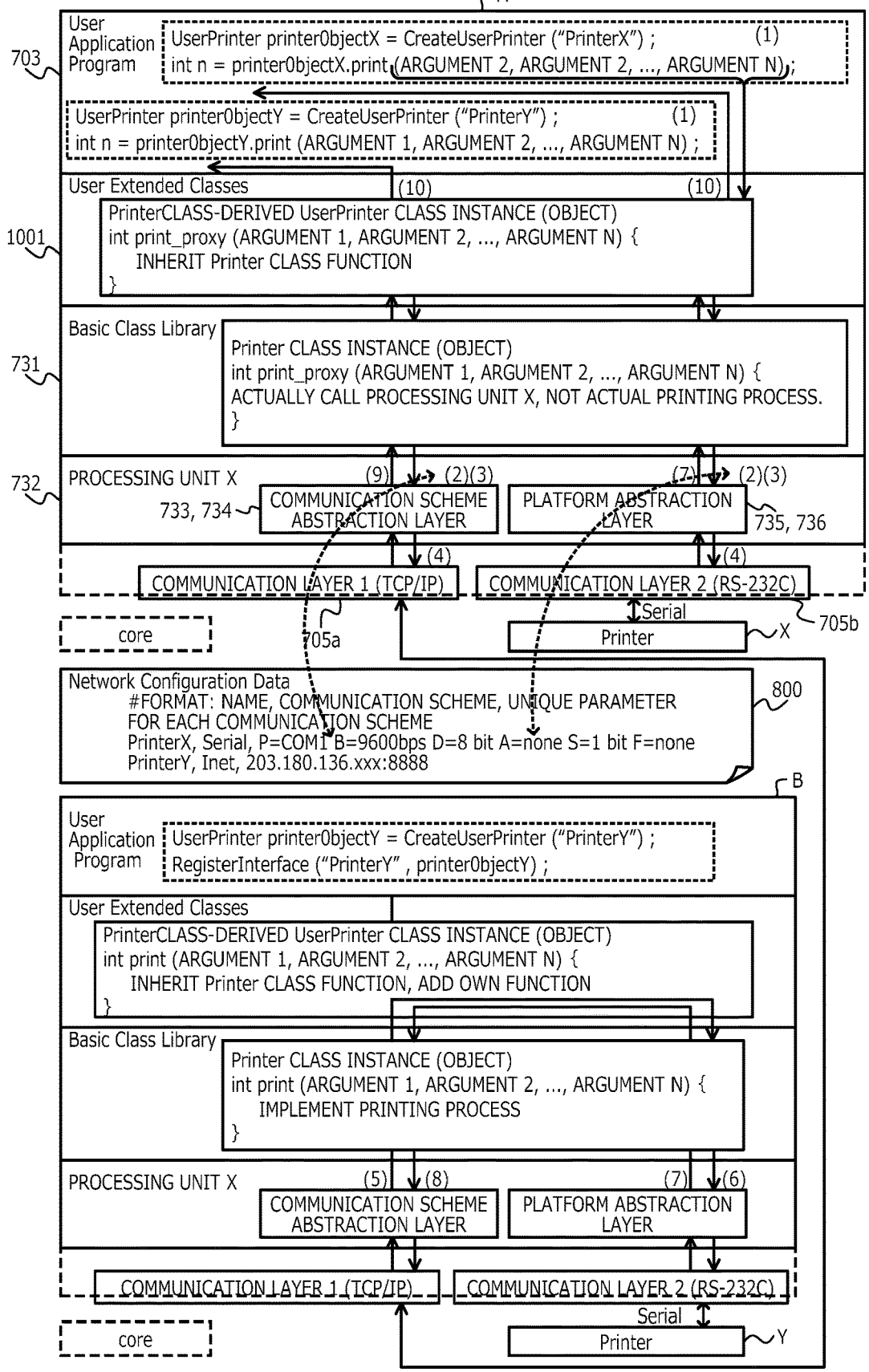
FIG. 10 is an explanatory diagram of invocation of a disclosed interface of an application.

FIG. 10 is an explanatory diagram of invocation of a disclosed interface of an application. In each of the control apparatuses A and B, User Extended Classes 1001 are disposed between the application program 703 and the Basic Class Library 731. The User Extended Classes 1001 inherits the class of the Basic Class Library 731, defines its own class, and discloses the functions thereof in a manner enabling the functions to be invoked from outside the control apparatus A. The example depicted in FIG. 10 presents the flow executed when the User Extended Classes 1001 defines a User Printer class whose printer class is inherited by the User Extended Classes 1001 and invokes this function between the control apparatuses A and B.

As depicted in FIG. 10, when the application program 703 of the control apparatus A accesses the printer X connected to the control apparatus A and executes the printing process, the application program 703 executes the processes at "1., 2., 3., 4., 7., and 10." in FIG. 10. In this case, the processing unit X732 of the control apparatus A solves the connection destination based on the information related to the serial port of the printer X connected to the control apparatus A using the Network Configuration Data 800 for the actual state of the name.

When the application program 703 of the control apparatus A accesses the printer Y connected to the other control apparatus B and causes the printer Y to execute the printing process, the application program 703 sequentially executes the processes at "1. to 10." in FIG. 10. In this case, the processing unit X732 of the control apparatus A solves the connection destination based on the connection method (the position information such as the external communication and the address) to the control apparatus B using the Network Configuration Data 800 for the actual state of the name.

The User Extended Classes 1001 of the control apparatus B "10." define a User Printer class whose printer class is inherited and discloses the defined class in, for example, the network. The control apparatus A may thereby access the corresponding printer Y based on the User Printer class disclosed by each of the other control apparatuses B, C, and the like.

FIG. 11 is a chart of an example of the definition of the disclosed interface capable of being remotely invoked. In the example depicted in FIG. 11, the interface is defined using the structure expressed in the C language. The control apparatus A may thereby remotely invoke the other control apparatus B using the name.

In the example depicted in FIG. 11, an argument list and a return value list each has therein pointers to functions to convert the size of the type and the data of the type into packets and to recover those from the packets. For example, the other control apparatus B discloses on the network the interface name and the pointer to the function to implement the interface as a list of disclosed interfaces and the control apparatus A may thereby invoke the other control apparatus B.

The control apparatuses A and B to n each broadcasts on the network, the disclosed lists and the position information acquired from the Network Configuration Data 800, and each of the nodes (the control apparatuses A and B to n) retains these pieces of information. The control apparatuses A to n may thereby share the pieces of interface information that are mutually disclosed.

FIG. 12 is an explanatory diagram of the invocation of the disclosed interface of the application. As depicted in FIG. 12, the control apparatuses A and B may each be configured to define the functions of plural objects as a function group x for the object itself of the application and disclose the interface to use the function group x.

In the example depicted in FIG. 12, when the control apparatus A accesses the device (the printer) Y of the control apparatus B, the control apparatus A accesses the device Y according to the procedure same as "1. to 10." as above and, in the course of this, the control apparatus B at "6. and 7." creates a database class and the printer class using the totaled results and registers the database class into a database 1200. The control apparatus B also outputs the totaled results from the printer Y as a report.

The application program 703 of the control apparatus B externally discloses the function group x as an external interface connected to the control apparatus B. Similarly, the control apparatus A registers the function group of the control apparatus A into the database 1200.

In the embodiment, registering the information for NAT traversal may solve a problem, for example, in that, with the network connection between the control apparatuses A and B, a host belonging to a private network using an NAT apparatus of the counterpart cannot directly be designated (NAT passage is unable).

FIG. 13 is a diagram of an example of a configuration of the NAT traversal between the control apparatuses. When an access is made to an object traversing NAT, the control apparatuses A and B each manage the position information of the object using a location server 1300. In the example depicted FIG. 13, when the control apparatus B is started up, the object registers the position information of the control apparatus B itself into the location server 1300 (step S1301).

Prior to the communication, the processing unit X732 of the control apparatus A accessing the control apparatus B makes an inquiry to the location server 1300 about the position information of the object to be the access destination (step S1302). The control apparatus A may access the remote object of the control apparatus B using the position information acquired as the result of the inquiry (the gateway address of the control apparatus B of the Network Configuration Data 800). The position information once solved is cached in the memory or the like of the control apparatus A, and the control apparatus A may thereby invoke the control apparatus B at a high speed without making any inquiry to the location server 1300 in the next invocation.

An example of system expansion for the control apparatus to directly detect the object of another control apparatus on the network will be described. In the above description, the parameters (the object name and the network parameters) set in advance between the control apparatuses A and B are referred to and the invocation of the object is thereby mutually executed between the control apparatuses A and B. Otherwise, the control apparatuses A and B each registers the parameters into the server and the control apparatuses A and B each refers to the parameters registered in the server to thereby mutually execute the invocation of the object between the control apparatuses A and B. In contrast to the static notice based on the setting made in advance as above, in the following description, examples will be described where no server or the like is disposed and the object is dynamically notified of directly only between the control apparatuses A and B.

FIGS. 14A and 14B are diagrams of an example of a notice by a newly participating control apparatus to other control apparatuses. As depicted in FIG. 14A, it is assumed that the control apparatus (a sensor device) A newly participates on the network NW. In this case, the sensor device A distributes a Discover notice 1401 as a greeting on the network NW by broadcasting or the like and thereby notifies the other control apparatus (a smartphone) B, another control apparatus (a sensor device) C, and another control apparatus (a smartphone) D of the Discovery notice 1401.

In this case, the sensor device A gives notification of the Discovery notice 1401 including the parameters (such as the object name) retained by the sensor device A itself. Though not depicted, the control apparatus (the sensor device) A includes, for example, the function of the device X (for example, a sensor), and the other control apparatuses B to D each also include the function of the device Y and the like.

As depicted in FIG. 14B, the other control apparatuses B to D each having the Discovery notice 1401 of the sensor device A received therein each thereafter learns the object name retained by the sensor device A. After the participation of the sensor device A is permitted, the other control apparatuses B to D each executes a response notice 1402 to return the object name retained by each of the other control apparatuses B to D to the sensor device A. The control apparatus (the sensor device) A may thereby learn the object names retained by the other control apparatuses B to D, and may remotely invoke the services (the functions corresponding to the devices X and Y) of the other control apparatuses B to D.

Figure 15B:
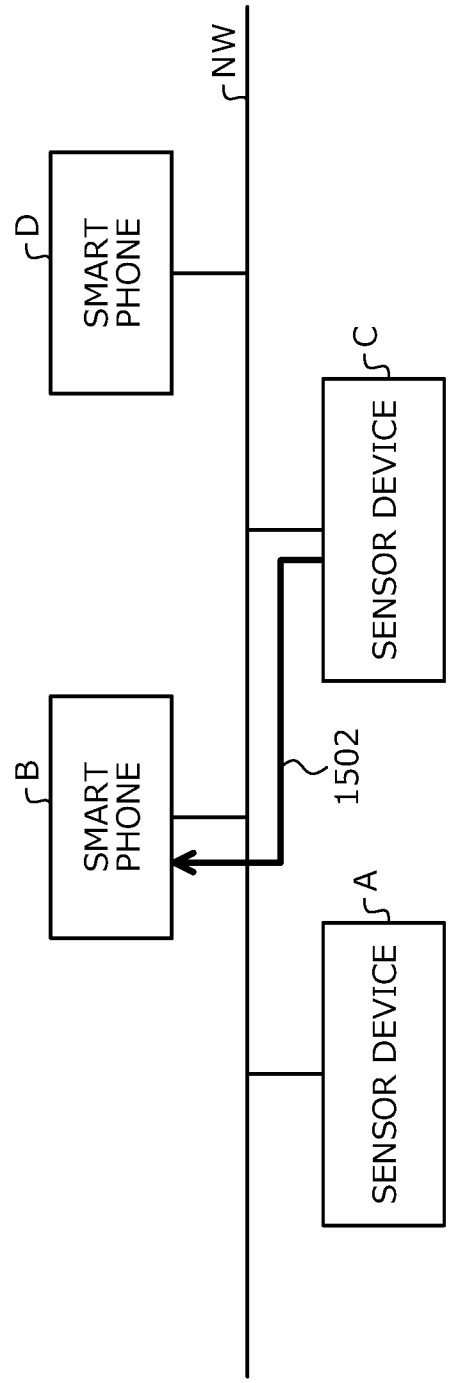
FIG. 15B is a diagram of an example of an inquiry from the control apparatus to another control apparatus.

FIGS. 15A and 15B are diagrams of an example of an inquiry from the control apparatus to another control apparatus. An example will be described where the control apparatus (the smartphone) B already participating based on the control in FIG. 14 and the like detects a new object (a service) of any one of the control apparatuses A, C, and D on the network NW.

As depicted in FIG. 15A, when the smartphone B does not know the information related to the network (such as the communication scheme and the communication parameters) of the desired object that the smartphone B desires to invoke, the smartphone B distributes by broadcasting or the like on the network NW, a Lookup notice 1501 that includes the object name to be inquired.

It is assumed that, as depicted in FIG. 15B, the sensor device C thereafter retains the corresponding object name, of the control apparatuses A, C, and D each having received the Lookup notice 1501 of the smartphone B. In this case, the control apparatus (the sensor device) C notifies the smartphone B of the network parameters that correspond to the object name (a notice 1502). The control apparatus (the smartphone) B may thereby remotely invoke the service retained by the control apparatus (the sensor device) C.

FIG. 16 is a diagram of an example of a notice issued when the control apparatus newly adds a service. When the control apparatus (the sensor device) A already participating based on the control of FIG. 14 and the like adds a new service, the sensor device A adds an object name that corresponds to the new service and executes a process (Bind) of correlating the object name and the network parameters with each other. The sensor device A notifies the other control apparatuses B to D of a new object name 1601 dynamically added, through the network NW by broadcasting. The control apparatus (the sensor device) A may thereby notify the other control apparatuses B to D that the control apparatus (the sensor device) A retains the new service, and the other control apparatuses B to D may each remotely invoke the service retained by the control apparatus (the sensor device) A.

FIGS. 17A and 17B are diagrams of an example of a control process program of the conventional other apparatus connected through a network. As depicted in FIG. 17A, the programming may be executed by a small number of steps without taking into consideration the processes necessary for communication or for access (open or closed) to the device X connected to the control apparatus A.

As depicted in FIG. 17B, however, when the control apparatus A accesses (open or closed) the device Y connected to the other control apparatus B, additional lines 1001a to 1001c and a correction line 1002 are necessary for the communication program necessary for the communication on the network between the control apparatus A and the control apparatus B, resulting in an increase of the work steps.

The control apparatus conventionally is a closed system that controls a device directly connected to the control apparatus, and the other control apparatus also conventionally is a closed system that controls another device directly connected to the other control apparatus. The device control across these closed systems additionally needs the program for the communication process because the communication on the network mediates therebetween. Therefore, conventionally, a problem arises in that the number of steps of the programming is significantly increased for the control apparatus to control the other device through the network. When the control target is changed from the device connected to the control apparatus to the other device on the network, another problem arises in that the number of steps for the change of the program is increased.

In the description above, while description has been given on the premise that the control apparatus A and the control apparatus B are connected through the network, when the control apparatuses A and B are each configured to include a distributed- or a multi-core CPU, a shared memory, and the like, the same problem arises with respect to the communication between the CPUs.

In contrast, in the embodiment, the control apparatus A creates the name to control the device X to be controlled or the other device Y connected to the other control apparatus B connected through the network NW, and the object that includes the function name and the argument information. The control apparatus A refers to the communication scheme and the communication parameters of the device X or the other device Y included in the information regarding the network NW and thereby acquires the information to access the object, converts the object name, the function name, and the argument information into a predetermined packet, selects the port that supports the communication scheme, and transmits the packet to the corresponding device X or the other control apparatus B to which the corresponding other device Y is connected.

The control apparatus A may thereby learn the function of the device Y connected to the control apparatus B and the control apparatus A may control the device Y connected to the control apparatus B concealing the communication scheme (the procedure) of the network NW. In this case, the control apparatus A does not transmit to the control apparatus B, the command itself to control the device Y but only has to refer to the process table T of the control apparatus B to thereby transmit only the identifier ID that includes the content of the control. The amount of the data to be transmitted may therefore be reduced.

Even when the control method differs between the control of the device X connected to the control apparatus A and the control of the other device Y connected to the other control apparatus B on the network NW, the control apparatus A may directly access the device Y and may execute the programming. When the control apparatus A controls the other device Y connected to the other control apparatus B through the network NW, no addition of a communication program for the network is necessary and no new dedicated I/F needs to be disposed for the communication on the network.

The program described in the present embodiment may be implemented by executing a prepared program on a computer such as a personal computer and a workstation. The program is stored on a non-transitory, computer-readable recording medium such as a hard disk, a flexible disk, a compact disc-read only memory (CD-ROM), a digital versatile disk (DVD), a flash memory, a universal serial bus (USB) memory, etc., read out from the computer-readable medium, and executed by the computer. The program may be distributed through a network such as the Internet.

According to the above configuration, the control apparatus can directly control the other device connected to the other control apparatus. The other device is controlled according to the program specific to the other control apparatus while the control apparatus can control the other device connected to the other control apparatus without an addition of a communication program of the network, or the like.

According to the present invention, an effect is achieved that the control apparatus may easily control the other device connected to the other control apparatus through the network.

As described, embodiments of the present invention are useful in software development for various control apparatuses that control another apparatus other than an apparatus connected to a control apparatus, for example, a device having an application-specific function, a general device control apparatus, and a device and/or device control apparatus with these built-in.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control apparatus for controlling a first device, and for controlling a second device through another control apparatus that is connected to the control apparatus via a network, the control apparatus comprising:
   a computing device; and
   a non-transitory storage medium containing program instructions for object-oriented programing, execution of which by the computing device causes the control apparatus to provide functions of:
      an object creating unit that creates an object for controlling the first device, and controlling the second device connected to the another control apparatus, wherein
         the object includes a flag,
         the flag of the object for controlling the first device has a first value, and
         the flag of the object for controlling the second device has a second value that is different from the first value;
      a communication processing unit that refers to a communication parameter of the first device or the second device from information related to the network to acquire information for accessing the object;
      a packet processing unit that converts the object into a packet, and selects a port based on the first or second value of the flag included in the object to output the packet; and
      a communicating unit that transmits the packet to the first device when the flag has the first value, and to the second device through the another control apparatus to which the second device is connected when the flag has the second value, wherein
   the object created by the object creating unit further includes an object name, a function name, and argument information for controlling the first device or the second device,
   the communication processing unit refers to the information related to the network, to acquire a communication scheme and the communication parameter of the first device or the second device as the information for accessing the object, and
   the packet processing unit converts the object name, the function name, the argument information, and the flag into the packet, and selects the port that supports the communication scheme to output the packet through the communicating unit.

2. The control apparatus according to claim 1, wherein the communicating unit distributes on the network, the object name of the object for controlling the first device when connecting the control apparatus to the network.

3. The control apparatus according to claim 1, wherein the communicating unit makes an inquiry about the object name of the object for controlling the second device through the network, and acquires the information related to the network for the second device that includes the object name from the another control apparatus.

4. The control apparatus according to claim 1, wherein the communicating unit distributes an object name of a new object on the network when the control apparatus adds the new object.

5. A device control system for controlling a first device or a second device, the system comprising:
   a control apparatus connected to the first device, and being configured to control the first device; and
   another control apparatus connected to the second device, and being configured to control the second device, the control apparatus being configured to control the second device through the another control apparatus, wherein
   the control apparatus comprises:
      a computing device; and
      a non-transitory storage medium containing program instructions for object-oriented programing, execution of which by the computing device causes the control apparatus to provide functions of:
         an object creating unit that creates an object for controlling the first device and the second device, the object constituting an object name, a function name, argument information and a flag, the flag of the object for controlling the first device having a first value, the flag of the object for controlling the second device having a second value that is different from the first value;
         a communication processing unit that refers to a communication scheme and a communication parameter of the first device or the second device from information that is preset and is related to a network, to acquire information for accessing the object;
         a packet processing unit that converts the object name, the function name, the argument information and the flag into a packet, and selects a port that supports the communication scheme based on the first or second value of the flag to deliver the packet; and
         a communicating unit that transmits the packet to the first device when the flag has the first value, and to the second device through the another control apparatus to which the second device is connected when the flag has the second value.

6. The device control system according to claim 5, wherein
   the control apparatus is connected to the another control apparatus through the network.

7. The device control system according to claim 5, wherein
   the control apparatus and the another control apparatus are CPUs that are connected to each other in a single apparatus.

8. A device control method for a device control system including a control apparatus and another control apparatus that is connected to the control apparatus via a network, the control apparatus being configured to control a first device, the another control apparatus being configured to control a second device, the method comprising:
   by the control apparatus,
   creating an object for controlling the first device and the second device, the object being constituted by an object name, a function name, argument information, and a flag, the flag of the object for controlling the first device having a first value, the flag of the object for controlling the second device having a second value that is different from the first value;
   referring to a communication scheme and a communication parameter of the first device or the second device from information related to the network to acquire information for accessing the object;
   converting the object name, the function name, the argument information, and the flag into a packet, and selecting a port that supports the communication scheme based on the first or second value of the flag included in the object to deliver the packet; and transmitting the packet to the first device when the flag has the first value, and to the second device through the another control apparatus to which the second device is connected when the flag has the second value.

9. The device control method according to claim 8, further comprising:

by the another control apparatus:

recovering the object name, the function name, and the argument information from the packet transmitted by the control apparatus to execute a control process; and converting a return value of an execution result into another packet, and transmitting the another packet to the control apparatus, and by the control apparatus, receiving the return value from the packet transmitted by the another control apparatus.

10. The device control method according to claim 8, wherein the device control system further comprises a server disposed between the control apparatus and the another control apparatus, the another control apparatus registers into the server, information related to a position of the object for controlling the second device on the network, and the control apparatus makes an inquiry to the server about the information related to the position of the object for controlling the second device on the network, and uses the information related to the position of the object for controlling the second device on the network acquired in response to the inquiry, to access the object for controlling the second device.

11. A non-transitory, computer-readable recording medium storing therein a device control program that causes a computer to execute the device control method according to claim 8.

12. The control apparatus according to claim 1, wherein the first device is directly connected to the control apparatus and the second device is directly connected to the another control apparatus.

13. The control apparatus according to claim 1, wherein the control apparatus and the first device are in one closed system that is controlled by the control apparatus, and the another control apparatus and the second device are in another closed system that is controlled by the another control apparatus.

14. The device control system according to claim 5, wherein the first device is directly connected to the control apparatus and the second device is directly connected to the another control apparatus.

15. The device control system according to claim 5, wherein the control apparatus and the first device are in one closed system that is controlled by the control apparatus, and the another control apparatus and the second device are in another closed system that is controlled by the another control apparatus.

16. The device control method according to claim 8, wherein the first device is directly connected to the control apparatus and the second device is directly connected to the another control apparatus.

17. The device control method according to claim 8, wherein the control apparatus and the first device are in one closed system that is controlled by the control apparatus, and the another control apparatus and the second device are in another closed system that is controlled by the another control apparatus.

* * * * *